(12) United States Patent
Pennala et al.

(10) Patent No.: US 12,493,921 B2
(45) Date of Patent: Dec. 9, 2025

(54) DATA PROCESSING SYSTEMS

(71) Applicant: ARM LIMITED, Cambridge (GB)

(72) Inventors: Jussi Tuomas Pennala, Oulu (FI);
Henrik Nils-Sture Olsson, Lund (SE);
Richard Bramley, Lund (SE); Nicholas John Nelson Murphy, Cambridge (GB)

(73) Assignee: Arm Limited, Cambridge (GB)

( * ) Notice: Subject to any disclaimer, the term of this patent is extended or adjusted under 35 U.S.C. 154(b) by 250 days.

(21) Appl. No.: 18/251,169

(22) PCT Filed: Nov. 4, 2021

(86) PCT No.: PCT/GB2021/052854
§ 371 (c)(1),
(2) Date: Apr. 28, 2023

(87) PCT Pub. No.: WO2022/096879
PCT Pub. Date: May 12, 2022

(65) Prior Publication Data
US 2023/0410246 A1    Dec. 21, 2023

(30) Foreign Application Priority Data

Nov. 4, 2020   (GB) .................................... 2017479

(51) Int. Cl.
*G06T 1/20*    (2006.01)
(52) U.S. Cl.
CPC ............ *G06T 1/20* (2013.01); *G06T 2200/28* (2013.01)
(58) Field of Classification Search
CPC ........ G06T 1/20; G06T 2200/28; G06T 11/40

USPC ............. 345/522, 502, 504; 712/30, E9.067
See application file for complete search history.

(56) References Cited

U.S. PATENT DOCUMENTS

| | | | |
|---|---|---|---|
| 9,483,317 B1* | 11/2016 | Shieh ................... | G06F 9/45558 |
| 2006/0251092 A1* | 11/2006 | Matterne ............... | G06F 9/3877 |
| | | | 712/E9.067 |
| 2012/0278590 A1* | 11/2012 | Lin ....................... | G06F 9/3897 |
| | | | 712/30 |
| 2012/0313952 A1* | 12/2012 | Nakayama ............. | G06F 1/329 |
| | | | 345/502 |
| 2013/0235053 A1 | 9/2013 | Bourd | |
| 2017/0236244 A1* | 8/2017 | Price .................... | G06F 9/5066 |
| | | | 345/504 |
| 2018/0322400 A1* | 11/2018 | Shahand ................ | G06F 11/30 |

(Continued)

FOREIGN PATENT DOCUMENTS

GB          2547252 A       8/2017

OTHER PUBLICATIONS

Combined Search Report and Examination Report under Sections 17 and 18(3) dated Aug. 23, 2021, GB Patent Application No. GB2017479.3.

(Continued)

*Primary Examiner* — Prabodh M Dharia
(74) *Attorney, Agent, or Firm* — Pearl Cohen Zedek Latzer Baratz LLP

(57) ABSTRACT

A data processing system that comprises plural processing units is disclosed. The system includes functional units, the functional units having different processing capacities. A set of one or more processing units can operate in combination with one of the functional units according to a processing capacity required for the set of one or more processing units.

19 Claims, 5 Drawing Sheets

(56) References Cited

U.S. PATENT DOCUMENTS

2020/0012531 A1    1/2020   Li et al.
2020/0174965 A1*   6/2020   Kumar ................ G06F 12/1072

OTHER PUBLICATIONS

International Search Report & The Written Opinion of the International Searching Authority dated Feb. 2, 2022, International Application No. PCT/GB2021/052854.

* cited by examiner

| | Partitions | | | | Partitions Layout on GPU Slices | | | | | | | |
|---|---|---|---|---|---|---|---|---|---|---|---|---|
| | PartitionA | PartitionB | PartitionC | PartitionD | GPU 0 (Large Tiler) | GPU 1 (No Tiler) | GPU 2 (Small Tiler) | GPU 3 (Small Tiler) | GPU 4 (Large Tiler) | GPU 5 (Large Tiler) | GPU 6 (Small Tiler) | GPU 7 (Small Tiler) |
| 401 | 24 Cores | - | - | - | PartitionA | | | | | | | |
| 402 | 21 Cores | 3 Cores | - | - | PartitionA | | | | | | | PartitionB |
| 403 | 18 Cores | 6 Cores | - | - | PartitionA | | | | | | PartitionB | PartitionB |
| 404 | 18 Cores | 3 Cores | 3 Cores | - | PartitionA | | | | | | PartitionB | PartitionC |
| 405 | 15 Cores | 9 Cores | - | - | PartitionA | | | | | PartitionB | PartitionB | PartitionB |
| 406 | 15 Cores | 6 Cores | 3 Cores | - | PartitionA | | | | | PartitionB | PartitionB | PartitionC |
| 407 | 15 Cores | 3 Cores | 3 Cores | 3 Cores | PartitionA | | | | | PartitionB | PartitionC | PartitionD |
| 408 | 12 Cores | 12 Cores | - | - | PartitionA | | | | PartitionB | PartitionB | PartitionB | PartitionB |
| 409 | 12 Cores | 9 Cores | 3 Cores | - | PartitionA | | | | PartitionB | PartitionB | PartitionB | PartitionC |
| 410 | 12 Cores | 6 Cores | 6 Cores | - | PartitionA | | | | PartitionB | PartitionB | PartitionC | PartitionC |
| 411 | 12 Cores | 6 Cores | 3 Cores | 3 Cores | PartitionA | | | | PartitionB | PartitionB | PartitionC | PartitionD |
| 412 | 9 Cores | 9 Cores | 3 Cores | 3 Cores | PartitionA | | | PartitionC | PartitionD | PartitionB | PartitionB | PartitionB |
| 413 | 9 Cores | 9 Cores | 3 Cores | 3 Cores | PartitionA | | | PartitionC | PartitionD | PartitionB | PartitionB | PartitionB |
| 414 | 9 Cores | 6 Cores | 6 Cores | 3 Cores | PartitionA | | | PartitionB | PartitionC | PartitionC | PartitionD | PartitionD |
| 415 | 6 Cores | 6 Cores | 6 Cores | 6 Cores | PartitionA | | PartitionB | | PartitionC | | PartitionD | |

FIG. 4

DATA PROCESSING SYSTEMS

BACKGROUND

The technology described herein relates to data processing systems and in particular to data processing systems that comprise plural processing units, such as graphics processing units (graphics processors) (GPUs).

It is becoming increasingly common for data processing systems to require multiple, independent data processing operations. For example, vehicles may have a display screen for the main instrument console, an additional navigation and/or entertainment screen, and an advanced driver assistance system (ADAS). Each of these systems may require their own data processing operations to be performed, and it may be necessary, e.g. for formal safety requirements, for them to be able to operate independently of each other.

One approach to such systems would be to provide a single graphics processing unit (GPU) that is time shared between the different data processing functions that are required. However, such time sharing can be complex and error prone, and may not be able to provide fully independent execution of the different data processing functions.

Alternatively, a completely separate graphics processing unit could be provided for each data processing function that is required. However, this may have negative implications, e.g. in terms of the number of processing components and/or cost required, as it would require the division of resources to be fixed at SoC (system on chip) creation time.

Data processing systems may typically make use of various functional units when generating data processing outputs, e.g. frames for display. For example, in a tile-based graphics processing system, generating a render output, e.g. frame, will typically comprise a tiling unit operating in combination with a set of one or more execution units, such as shader cores, of a graphics processing unit (GPU). For example, generating a render output may typically comprise execution units of a graphics processing unit (GPU) performing vertex processing operations to generate processed vertex data, and a tiling unit preparing primitive lists using the processed vertex data. Execution units of the graphics processing unit (GPU) may then perform fragment processing operations using the prepared primitive lists. In some arrangements, the vertex processing and primitive list preparation operations are effectively combined. In such arrangements, a tiling unit may distribute vertex processing tasks to execution units to generate processed vertex data as and when the tiling unit actually requires processed vertex data in order to prepare primitive lists.

The Applicants believe that there remains scope for improvements to data processing systems.

BRIEF DESCRIPTION OF THE DRAWINGS

Embodiments of the technology described herein will now be described by way of example only and with reference to the accompanying drawings, in which:

FIG. 4 shows schematically various operating modes of the data processing system of FIG. 3 in accordance with embodiments of the technology described herein.

Like reference numerals are used for like components where appropriate in the drawings.

DETAILED DESCRIPTION

Figure 1:
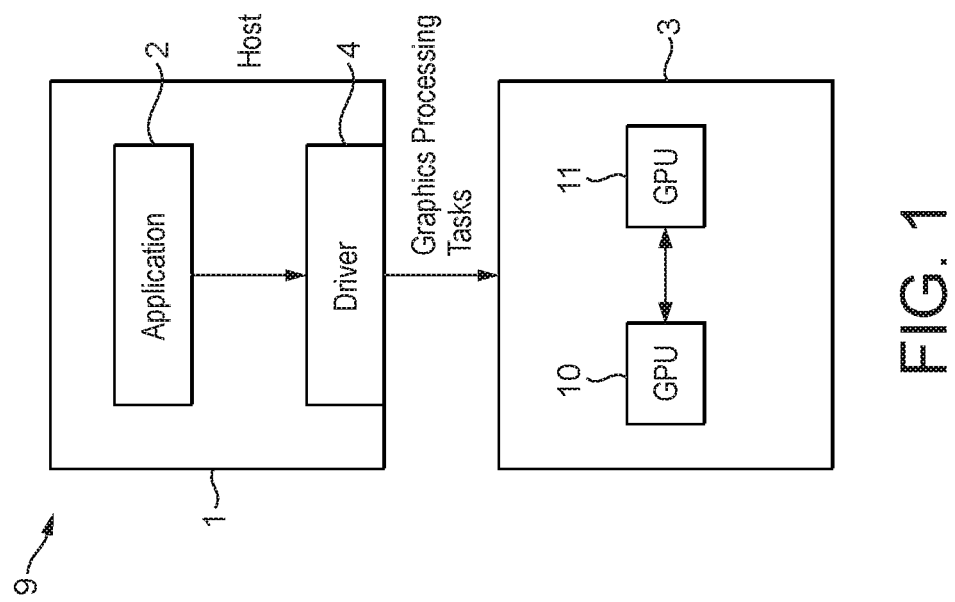
FIG. 1 shows a data processing system in accordance with an embodiment of the technology described herein.

A first embodiment of the technology described herein comprises a data processing system comprising:
   a plurality of graphics processing units, wherein one or more of the graphics processing units are operable in combination with at least one other graphics processing unit of the plurality of graphics processing units such that respective sets of one or more graphics processing units of the plurality of graphics processing units can generate respective data processing outputs; and
   a plurality of functional units configured to perform the same processing operation, each functional unit operable in combination with a set of one or more of the graphics processing units when generating a data processing output;
   wherein the throughput of at least one functional unit of the plurality of functional units when performing the processing operation is greater than the throughput of at least one other functional unit of the plurality of functional units when performing the processing operation.

A second embodiment of the technology described herein comprises a method of operating a data processing system that comprises:
   a plurality of graphics processing units, wherein one or more of the graphics processing units are operable in combination with at least one other graphics processing unit of the plurality of graphics processing units such that respective sets of one or more graphics processing units of the plurality of graphics processing units can generate respective data processing outputs; and
   a plurality of functional units configured to perform the same processing operation, each functional unit operable in combination with a set of one or more of the graphics processing units when generating a data processing output;
   wherein the throughput of at least one functional unit of the plurality of functional units when performing the processing operation is greater than the throughput of at least one other functional unit of the plurality of functional units when performing the processing operation;
   the method comprising:
   configuring a set of one or more graphics processing units of the plurality of graphics processing units to generate a data processing output;
   configuring a functional unit of the plurality of functional units that has a throughput when performing the processing operation that is sufficient to match a throughput of the set of one or more graphics processing units when generating a data processing output to operate in combination with the set of one or more graphics processing units when generating the data processing output; and
   the functional unit performing the processing operation when operating in combination with the set of one or more graphics processing units when generating the data processing output.

The technology described herein is concerned with a data processing system that includes a plurality of graphics processing units at least some of which can operate in combination with at least one other graphics processing unit of the plurality of graphics processing units to generate a data processing output, e.g. frame for display. As will be discussed in more detail below, some, and in an embodiment all, of the graphics processing units of the plurality of graphics processing units are also operable to generate a data processing output, e.g. frame, on their own (i.e. independently of any other graphics processing unit of the plurality of graphics processing units).

Thus, the data processing system of the technology described herein can generate a data processing output, e.g. frame for display, using a set of only a single one of the plurality of graphics processing units (that is operating independently), or using a set of plural ones of the plurality of graphics processing units (that are operating in combination).

Equally, the data processing system of the technology described herein should be (and in an embodiment is) operable such that different sets of one or more graphics processing units of the plurality of graphics processing units can generate data processing outputs independently of each other. That is, the plurality of graphics processing units should be, and in an embodiment is, partitionable into one or more sets ("partitions") of one or more graphics processing units, wherein each set (partition) of one or more graphics processing units is operable to generate a data processing output, e.g. frame, independently of any other set (partition) of one or more graphics processing units of the one or more sets (partitions) of one or more graphics processing units.

This means, for example, that different sets (partitions) of one or more graphics processing units may generate different data processing outputs, e.g. different frames for display on different displays, in an embodiment simultaneously. For example and in an embodiment, the data processing system may be used for automotive applications. In this case, there may be a respective "partition" to generate a data processing output for each of one or more of: a display screen for the main instrument console, an additional navigation and/or entertainment screen, and an Advanced Driver Assistance System (ADAS), etc.

To facilitate data processing output generation, the data processing system of the technology described herein includes a plurality of functional units, each of which can perform a (the same) (type of) processing operation that in an embodiment generates an output (or outputs) to be used when generating a data processing output, e.g. frame. A (and in an embodiment each) set (partition) of one or more (e.g. combined) graphics processing units of the plurality of graphics processing units should (and in an embodiment does) operate in combination with (only) one functional unit of the plurality of functional units when generating a data processing output, e.g. frame. For example, and in an embodiment, and as will be discussed further below, each functional unit may be a tiling unit which uses processed vertex data generated by a set (partition) of one or more graphics processing units to prepare primitive lists (i.e. lists of geometry (e.g. primitives) to be rendered for respective regions of a render output) for use by the set (partition) of one or more graphics processing units when generating a render output, e.g. frame, on a tile-by-tile basis.

(As will be discussed further below, the functional units may be provided as part of the graphics processing units themselves, or there may, e.g., be a separate "pool" of functional units.)

The data processing system of the technology described herein includes a plurality of such functional units (e.g. tiling units), such that, for example, different ones of the plurality of functional units (e.g. different tiling units) can operate in combination with different sets (partitions) of one or more (e.g. combined) graphics processing units of the plurality of graphics processing units that are generating different data processing outputs (simultaneously).

In the technology described herein, the plurality of functional units includes functional units that have different throughputs (when performing the processing operation in question). That is, the maximum rate at which at least one functional unit of the plurality of functional units can receive an input(s) of the processing operation, and/or perform the processing operation (on the received input(s)), and/or generate an output(s) of the processing operation is greater than the maximum rate at which at least one other functional unit of the plurality of functional units can receive an input(s) of the processing operation, and/or perform the processing operation (on the received input(s)), and/or generate an output(s) of the processing operation.

For example, and in an embodiment, and as will be discussed in more detail below, the system may include one or more "small" tiling units that each have a relatively lower throughput, and can thus only prepare primitive lists at a relatively slower rate, and one or more "large" tiling units that each have a higher processing capacity, and so can prepare primitive lists at a faster rate.

Correspondingly, references herein to a throughput of a functional unit when performing the processing operation are intended to refer to the throughput for the type of processing operation in question that the functional unit is configured to be able achieve (support), and thus, unless the context otherwise requires, refer to a (maximum) supported throughput (processing capacity) that the functional unit is capable of performing the (type of) processing operation at (i.e. a processing capacity of the functional unit for performing the processing operation).

Thus, references herein to the throughput of a functional unit when performing the processing operation being greater than the throughput of another functional unit when performing the processing operation are intended to refer to a functional unit having a higher (maximum) supported (achievable) throughput (processing capacity) than another functional unit for performing the type of processing operation in question.

Similarly, references herein to a throughput of a set of one or more processing units when generating a data processing output are intended to refer to the (maximum) throughput that the set of one or more processing units is capable of generating the data processing output at when the one or more processing units are operating in combination with each other (i.e. a processing capacity of the set of one or more processing units for generating the data processing output).

Thus, another embodiment of the technology described herein comprises a data processing system comprising:
  a plurality of graphics processing units, wherein one or more of the graphics processing units are operable in combination with at least one other graphics processing unit of the plurality of graphics processing units such that respective sets of one or more graphics processing units of the plurality of graphics processing units can generate respective data processing outputs; and
  a plurality of functional units configured to perform the same type of processing operation, each functional unit operable in combination with a set of one or more of the graphics processing units when generating a data processing output;

wherein the processing capacity of at least one functional unit of the plurality of functional units for performing the processing operation is greater than the processing capacity of at least one other functional unit of the plurality of functional units for performing the processing operation.

Another embodiment of the technology described herein comprises a method of operating a data processing system that comprises:

a plurality of graphics processing units, wherein one or more of the graphics processing units are operable in combination with at least one other graphics processing unit of the plurality of graphics processing units such that respective sets of one or more graphics processing units of the plurality of graphics processing units can generate respective data processing outputs; and a plurality of functional units configured to perform the same type of processing operation, each functional unit operable in combination with a set of one or more of the graphics processing units when generating a data processing output;

wherein the processing capacity of at least one functional unit of the plurality of functional units for performing the processing operation is greater than the processing capacity of at least one other functional unit of the plurality of functional units for performing the processing operation;

the method comprising:

configuring a set of one or more graphics processing units of the plurality of graphics processing units to generate a data processing output;

configuring a functional unit of the plurality of functional units that has a processing capacity for performing the processing operation that is sufficient to match a processing capacity of the set of one or more graphics processing units for generating a data processing output to operate in combination with the set of one or more graphics processing units when generating the data processing output; and the functional unit performing the processing operation when operating in combination with the set of one or more graphics processing units when generating the data processing output.

The Applicants have recognised that in a data processing system which includes graphics processing units which can be operated independently or in combination, a data processing output, e.g. frame, may be generated with different possible performance levels corresponding to different graphics processing units and combinations of graphics processing units being used to generate the data processing output, e.g. frame. For example, a frame may be generated with higher performance, for example at a relatively higher speed and/or resolution, when plural graphics processing units are used in combination to generate the frame, as compared to the frame being generated by only a single one of those graphics processing units operating independently. Moreover, the data processing system will typically be able to generate a data processing output, e.g. frame, with maximum possible performance when the maximum possible number of graphics processing units that can be used in combination are used in combination.

This means that a functional unit (e.g. tiling unit) that performs a processing operation when generating such a data processing output (e.g. frame) using a plurality of graphics processing units in combination should desirably be able to receive an input(s) of the processing operation, and/or perform the processing operation, and/or generate an output(s) of the processing operation at a rate that is fast enough to match the performance level of the plurality of graphics processing units. That is, the throughput (processing capacity) of a functional unit should desirably match the throughput (processing capacity) of the plural graphics processing units operating in combination, e.g. so as to avoid a "bottleneck" and resulting reduction in performance.

While it would be possible for all of the plural functional units to be configured to have sufficiently high (maximum supported) throughputs (processing capacities) for any combination of graphics processing units that may be used, the Applicants have recognised that such high system performance will typically only be achievable when the maximum possible number of graphics processing units are operating in combination, and lower performance levels will typically result whenever fewer graphics processing units are used to generate a data processing output. As such, and as will be discussed in more detail below, not all of the plural functional units (e.g. tiling units) need to have (support) such, relatively high, throughputs (processing capacities). Rather, it is possible for one or more of the functional units to have (support) a lower (maximum) throughput (processing capacity).

The technology described herein accordingly provides functional units having (supporting) different (maximum) throughputs (processing capacities). As will be discussed in more detail below, different (maximum supported) throughputs (processing capacities) of different functional units may be tailored to match different possible system performance levels corresponding to different graphics processing units and combinations of graphics processing units being used to generate a data processing output, e.g. frame. This can lead to a reduction in the overall hardware/silicon area costs associated with the functional units, whilst still providing the desired system performance.

It will be appreciated, therefore, that the technology described herein provides an improved data processing system.

The data processing system of the technology described herein can comprise any desired number of plural graphics processing units. In an embodiment, there are a power of two number of graphics processing units, such as two, four or eight graphics processing units in the plurality of graphics processing units. However, other numbers of graphics processing units would be possible, such as three or six.

The graphics processing units can comprise any suitable and desired form of graphics processing units (graphics processors (GPUs)). They may perform any suitable and desired form of graphics processing, such as rasterisation-based rendering, ray-tracing, hybrid ray-tracing etc. In an embodiment, each graphics processing unit is a tile-based graphics processing unit.

Each graphics processing unit in an embodiment comprises one or more programmable circuits that can be programmed to perform desired graphics processing operations. For example, each graphics processing unit in an embodiment comprises a set of one or more execution units, such as, and in an embodiment, one or more shader (programmable processing) cores. Each such execution unit (e.g. shader core) is in an embodiment operable to execute (e.g. shader) program instructions to perform processing operations indicated by the program instructions, such as, and in an embodiment, vertex processing operations, such as vertex shading, and/or fragment processing operations, such as fragment shading.

Different graphics processing units of the plurality of graphics processing units may have the same or different numbers of execution units, e.g. shader cores. In an embodiment a (and in an embodiment each) graphics processing unit includes a plurality of execution units, such as three or four execution units (programmable processing (shader) cores). It will be appreciated here that the (maximum supported) throughput (processing capacity) of a graphics processing unit, and thus of a set (partition) of one or more graphics processing units, will in an embodiment be proportional to the number of execution units that the graphics processing unit, or set (partition) of one or more graphics processing units, comprises.

As discussed above, in the technology described herein, some, and in an embodiment all, of the graphics processing units should be able to operate in combination with at least one other graphics processing unit of the plurality of graphics processing units to generate the same data processing output, e.g. frame.

Graphics processing units operating in combination with each other in an embodiment comprises execution units of different graphics processing units performing processing operations for the purposes of generating the same data processing output, e.g. output frame for display. For example, execution units of different graphics processing units may perform vertex and/or fragment processing operations (e.g. vertex or fragment shading) to generate the same render output (frame), e.g. in parallel.

A graphics processing unit may be able to operate in combination with only some but not all of the other graphics processing units of the plurality of graphics processing units, or with all other graphics processing units of the plurality of graphics processing units. Moreover, as will be discussed in more detail below, the system may be configurable such that a graphics processing unit can operate in combination with different numbers of other graphics processing units of the plurality of graphics processing units.

Thus, a set of plural graphics processing units that are operating in combination with each other to generate a (the same) data processing output may comprise two or more graphics processing units of the plurality of graphics processing units. It may comprise all of the graphics processing units of the plurality of graphics processing units that the data processing system comprises, or only a subset of that plurality of graphics processing units.

To facilitate combined operation, in an embodiment, graphics processing units that can operate in combination with each other are connectable such that they can communicate with each other. Graphics processing units generating a data processing output in combination with each other will thus in an embodiment comprise the graphics processing units communicating with each other.

In an embodiment, each graphics processing unit comprises an interconnect, and graphics processing units are connected to each other via their respective interconnects.

Each graphics processing unit could be directly connected to (and thus be able to directly communicate with) each and every other graphics processing unit that the graphics processing unit can operate in combination with. Graphics processing units could be connected in a "star" arrangement, or via a packet based interconnect. In an embodiment, however, graphics processing units are connected in a "daisy-chain" arrangement.

Thus, in an embodiment, graphics processing units are arranged in a sequence, and only the interconnects of immediately adjacent pairs of graphics processing units in the sequence are directly connected to each other. In an embodiment, all of the graphics processing units of the plurality of graphics processing units are connected in this manner, i.e. in a "daisy-chain" sequence.

Thus, in an embodiment, the interconnect of each graphics processing unit is connected to the interconnect of either one or two other graphics processing units. Each interconnect may also be configured to facilitate communications with internal components of the respective graphics processing unit, such as, and in an embodiment, the set of one or more execution units.

Communications between graphics processing units that are operating in combination can take any suitable form. In an embodiment, there is a master-slave relationship between communicating graphics processing units.

Thus, in an embodiment, some or all, and in an embodiment each, of the graphics processing units are operable to act as a master (primary) graphics processing unit and/or as a slave (secondary) graphics processing unit. When operating as a master (primary) graphics processing unit, a graphics processing unit may control processing operations on one or more other graphics processing units of the plurality of graphics processing units that are each acting as a slave (secondary) graphics processing unit. When operating as a slave (secondary) graphics processing unit, a graphics processing unit may perform processing operations under the control of another graphics processing unit of the plurality of graphics processing units that is acting as a master (primary) graphics processing unit.

Thus, a set of plural graphics processing units that are generating a data processing output in combination with each other in an embodiment comprises (only) one graphics processing unit that is acting as a master (primary) graphics processing unit, and one or more other graphics processing units that are each acting as a slave (secondary) graphics processing unit.

Thus, in an embodiment, some or all, and in an embodiment each, of the graphics processing units are operable to generate a data processing output in combination with at least one other graphics processing unit of the plurality of graphics processing units under the control of the respective graphics processing unit or under the control of one of the at least one other graphics processing unit.

In an embodiment, a graphics processing unit can only control, i.e. act as a master for, graphics processing units that follow it in the "daisy-chain" sequence. Correspondingly, a graphics processing unit can in an embodiment only be controlled by, i.e. act as a slave for, graphics processing units that precede it in the "daisy-chain" sequence. The arrangement is in an embodiment such that a graphics processing unit can only control (i.e. act as a master for) a contiguous set of one or more other graphics processing units that immediately follow the graphics processing unit in the "daisy-chain" sequence (and that are each acting as slave).

Thus in an embodiment, a set of plural graphics processing units that are generating a data processing output in combination with each other is a set of contiguous graphics processing units (in the "daisy-chain" sequence).

As already mentioned, some, and in an embodiment all, of the graphics processing units of the plurality of graphics processing units should also be, and in an embodiment are, operable to generate a data processing output, e.g. frame, independently of each other graphics processing unit of the plurality of graphics processing units (not in combination with any of the other graphics processing units).

That is, some, and in an embodiment all, of the graphics processing units of the plurality of graphics processing units are in an embodiment capable of operating in a "standalone" mode. In this mode, a (set of only one) graphics processing unit of the plurality of graphics processing units may generate a data processing output, e.g. frame, substantially in the normal manner for the type of graphics processing unit in question.

To facilitate this, when a graphics processing unit is operating in standalone mode, communications between the graphics processing unit and any other graphics processing unit that it is connected to (via their interconnects) are in an embodiment disabled.

Thus, in an embodiment, each graphics processing unit of the plurality of graphics processing units can operate in a master and/or slave and/or standalone mode. A graphics processing unit may be able to operate in one mode only (e.g. slave mode only), two different modes only (e.g. standalone mode or master mode, or in standalone mode or slave mode), or may be able to operate in each of the three modes (i.e. the standalone mode, master mode or slave mode), e.g., and in an embodiment, depending upon the layout of the graphics processing units and how many graphics processing units there are in the data processing system, etc.

Where plural different modes are possible, in an embodiment, the mode of operation of a graphics processing unit can be set in use, e.g., and in an embodiment, by appropriate configuration of the graphics processing unit using, e.g., software, in use.

Thus, in an embodiment, one or more, and in an embodiment each, graphics processing unit of the plurality of graphics processing units is configurable to operate in at least two different modes of operation, and the system comprises a control circuit configured to configure each configurable graphics processing unit to operate in a selected one of the at least two different modes of operation. The at least two different modes of operations in an embodiment include two, or all, of: a standalone, a master, and a slave mode of operation.

The control circuit in an embodiment comprises a set of control registers that can be set, for example and in an embodiment by software executing on a (host) processor, to configure each graphics processing unit to operate in the desired mode.

As already mentioned, the data processing system should be, and in an embodiment is, operable such that different sets of one or more graphics processing units of the plurality of graphics processing units can perform processing operations independently of each other. That is, the plurality of graphics processing units should be, and in an embodiment is, partitionable into one or more sets (partitions) of one or more graphics processing units, wherein each set (partition) of one or more graphics processing units is operable to generate a data processing output, e.g. frame, independently of any other set of one or more graphics processing units of the one or more sets of one or more graphics processing units. In an embodiment, different sets (partitions) can generate different data processing outputs (e.g. different frames for display on different displays) simultaneously.

In an embodiment, there are plural possible modes of operation in which the system can operate, wherein in each different mode of operation the plurality of graphics processing units is partitioned in a different way (in other words, each mode of operation corresponds to a different partitioning (subdivision into different partitions) of the set of all of the graphics processing units). For example, in one mode of operation, all of the graphics processing units may be included in a single partition (and thus all operable together, in combination), in another mode of operation a first subset of the graphics processing units may be included in one partition and the remaining graphics processing units may be included in another partition, in another mode of operation a second, different subset of the graphics processing units may be included in one partition and the remaining graphics processing units may be included in another partition, etc. In other modes of operation, the graphics processing units may be partitioned into three, four or more partitions, etc.

Thus, the plurality of graphics processing units may be partitionable (and partitioned) (by the control circuit) into any suitable and desired number of (independently functioning) partitions, such as one, two, three, four, or more partitions. In an embodiment, there is a maximum number of partitions that the system can support at any one time. In this case, the graphics processing units can in an embodiment be partitioned into each (positive integer) number of partitions up to and including the maximum number of partitions. The maximum number of partitions may be, e.g., two, four, eight, or another number of partitions at any one time.

To facilitate this, in an embodiment, the control circuit is configured to configure each configurable graphics processing unit such that the plurality of graphics processing units is partitioned into one or more sets (partitions) of one or more graphics processing units (corresponding to a mode of operation of the plural possible modes of operation). For example, the control circuit in an embodiment configures each configurable graphics processing unit such that each set (partition) of one or more graphics processing units includes either only one graphics processing unit that is operating in standalone mode, or one master graphics processing unit and one or more slave graphics processing units.

Thus in an embodiment, the plurality of graphics processing units is partitioned, in an embodiment by the control circuit, into one or more sets (partitions) of one or more graphics processing units (corresponding to a mode of operation of the plural possible modes of operation), wherein each set (partition) of one or more graphics processing units is operable (independently) to generate a data processing output, e.g. frame.

In an embodiment, each graphics processing unit that can operate in standalone mode can receive graphics processing instructions, e.g. from a (driver that is executing on a) host processor or virtual machine that requires the data processing output, and carry out received instructions independently. For example, each standalone-capable graphics processing unit in an embodiment has an associated (task) management circuit (e.g. job manager) that can provide a suitable software interface for the graphics processing unit operating in standalone mode.

Correspondingly, each graphics processing unit that can operate in master mode in an embodiment can receive graphics processing instructions, e.g. from a (driver that is executing on a) host processor or virtual machine that requires the data processing output, and cause the instructions to be carried out by the master graphics processing unit and the one or more slave graphics processing units it is controlling operating in combination. Each master-capable graphics processing unit in an embodiment has an associated management circuit (e.g. job manager) that can provide a suitable software interface for itself and a set of one or more slave graphics processing units it is controlling. This in an embodiment has the effect that to any external application and driver that is using the data processing system, it appears as though there is only a single graphics processing unit.

The data processing system and/or graphics processing unit(s) of the technology described herein may include, as appropriate, one or more of the features described in US 2017/0236244, the entire contents of which is incorporated herein by reference, and/or US 2019/0056955, the entire contents of which is incorporated herein by reference.

The system includes a plurality of functional units, which are each operable to perform (and perform) the same (type of) processing operation for the purposes of generating a data processing output, e.g. frame. (It will be appreciated here that while each functional unit is configured to perform the same type of processing operation, such as a tiling operation, in use each functional unit will be perform that operation for its own, respective, set of input data, and produce its own, respective output from that input data.)

Each functional unit can operate in combination with a set (partition) of one or more of the graphics processing units. A functional unit should be, and in an embodiment is, able to operate in combination with only one partition at any one time, but may be able to operate in combination with different partitions at different times. A functional unit should, and in an embodiment will, perform the processing operation when operating in combination with a set (partition) of one or more of the graphics processing units. The arrangement should be, and in an embodiment is, such that a functional unit will, when performing the processing operation, consume an input of the processing operation from, and/or produce an output of the processing operation for, the (executions units of the) set (partition) of one or more of the graphics processing units that the functional unit is operating in combination with.

Each functional unit of the plurality of functional units is configured to perform the same (type of) processing operation, but one or more functional units of the plurality of functional units has a higher supported (maximum) throughput (processing capacity) than one or more other functional units of the plurality of functional units for performing the processing operation in question (i.e. at least some of the functional units will have different maximum (possible) throughputs when (processing capacities for) performing the processing operation (for a given set of input data)).

For example, one functional unit may be able to perform the processing operation in a shorter time than another functional unit, and/or one functional unit may be able to perform more instances of the processing operation at the same time (e.g. in parallel) than another functional unit. Thus there is in an embodiment at least one "higher throughput" (processing capacity) functional unit, and at least one "lower throughput" (processing capacity) functional unit.

The throughput (processing capacity) of a functional unit may relate and correspond to the rate at which the functional unit will produce (provide) an (its) output for the processing operation (from a given set of input data). Thus a functional unit with a higher throughput (processing capacity) may produce an output of the processing operation at a faster rate than a functional unit with a lower throughput (processing capacity). Similarly, the throughput (processing capacity) of a functional unit may relate and correspond to the rate at which the functional unit will receive and process (a given set of) input data for the processing operation. Thus a functional unit with a higher throughput (processing capacity) may consume an input of the processing operation at a faster rate than a functional unit with a lower throughput (processing capacity).

The arrangement should be, and in an embodiment is, such that each set (partition) of one or more graphics processing units will, whenever possible, operate in combination with a functional unit of the plurality of functional units that has a sufficient (maximum supported) throughput (processing capacity) for that set (partition) of one or more graphics processing units. Thus, the (maximum supported) throughput (processing capacity) of the functional unit is in an embodiment so as to produce an output of the processing operation at a rate that is (at least) as fast as the rate at which the (associated) set (partition) of one or more graphics processing units will (be able or expected to) consume that output and/or so as to consume an input of the processing operation at a rate that is (at least) as fast as the rate at which the (associated) set (partition) of one or more graphics processing units will (be able or expected to) produce that input.

For example, in the case of a tiling unit, the time that the tiling unit is expected to take to prepare primitive lists for a typical frame may be approximately equal to or less than the time that execution units of the set (partition) of one or more graphics processing units are expected to take to perform vertex processing operations to generate processed vertex data that the tiling unit uses to prepare the primitive lists and/or the time that the execution units are expected to take to perform fragment processing operations using primitive lists prepared by the tiling unit.

Different functional units can be provided with different (maximum supported) processing capacities (throughputs) in any suitable and desired manner. For example, an in an embodiment, different functional units may have different hardware capabilities, for example on account of having different numbers of transistors, and/or different clock speeds. Thus, the at least one "higher throughput" functional unit in an embodiment comprises a higher transistor count and/or can operate at a higher clock speed than the at least one "lower throughput" functional unit.

The plurality of functional units can comprise any suitable and desired number of plural functional units, such two, four, eight or another number of functional units. The number of functional units in the plurality of functional units may be greater than or equal to the maximum number of partitions that the system can support at any one time, e.g. such that each partition can operate in combination with a respective one of the functional units independently. However, fewer functional units could be provided.

The different (maximum supported) throughputs (processing capacities) the functional units can be selected as desired.

In an embodiment, there is a maximum possible number of the graphics processing units that can operate in combination with each other to generate a data processing output (as a single partition), and such operation in an embodiment corresponds to maximum possible system performance. The maximum possible number of the graphics processing units that can operate in combination may correspond to only some of the plurality of graphics processing units, or may correspond to all of the graphics processing units operating in combination with each other.

To facilitate this, the (supported, maximum) throughput (processing capacity) of (each of the) at least one ("higher throughput") functional unit of the plurality of functional units is in an embodiment sufficient to match a throughput (processing capacity) of the maximum possible number of (e.g. all of) the graphics processing units operating in combination (to generate the same data processing output). (Thus, the throughput (processing capacity) of the functional unit is in an embodiment so as to produce an output of the processing operation at a rate that is (at least) as fast as the rate at which the maximum possible number of (e.g. all of) the graphics processing units operating in combination (to generate the same data processing output) will (be able or expected to) consume that output and/or so as to consume an input of the processing operation at a rate that is (at least) as fast as the rate at which the maximum possible number of (e.g. all of) the graphics processing units operating in combination (to generate the same data processing output) will (be able or expected to) produce that input.) Such a ("highest throughput") functional unit will then in an embodiment be operated in combination with a set (partition) of the maximum possible number of (e.g. all of) the graphics processing units that is generating a data processing output.

Correspondingly, the (supported, maximum) throughput (processing capacity) of (each of the) at least one ("higher throughput") functional unit of the plurality of functional units is in an embodiment sufficient to match a throughput (processing capacity) of a maximum possible number of (e.g. all of) the execution units (of the maximum possible number of the graphics processing units) operating in combination (to generate the same data processing output).

As discussed above, the Applicants have recognised that not all of the plural functional units need to have (support) such a, relatively high, (maximum) throughput (processing capacity). Accordingly, in an embodiment the (supported, maximum) throughput (processing capacity) of (each of the) at least one other ("lower throughput") functional unit of the plurality of functional units is not (is other than) sufficient to match the throughput (processing capacity) of the maximum possible number of (e.g. all of) the graphics processing units operating in combination. (Thus, the (maximum supported) throughput (processing capacity) of the functional unit is in an embodiment so as to produce an output of the processing operation at a rate that is less than the rate at which the maximum possible number of (e.g. all of) the graphics processing units operating in combination (to generate the same data processing output) will (be able or expected to) consume that output and/or so as to consume an input of the processing operation at a rate that is less than the rate at which the maximum possible number of (e.g. all of) the graphics processing units operating in combination (to generate the same data processing output) will (be able or expected to) produce that input.)

For example, the time that such a ("lower throughput") tiling unit is expected to take to prepare primitive lists for a typical frame should be, and in an embodiment is, greater than the time that the maximum possible number of (e.g. all of) the execution units operating in combination would be expected to take to perform vertex or fragment processing operations for that frame.

The arrangement is in an embodiment such that the (maximum supported) throughput (processing capacity) of (each of the) at least one other ("lower throughput") functional unit of the plurality of functional units is sufficient to match a throughput (processing capacity) of some but not all of the maximum possible number of the execution units (of the maximum possible number of the graphics processing units) operating in combination.

In an embodiment, the (maximum supported) throughput (processing capacity) of (each of the) at least one other ("lower throughput") functional unit of the plurality of functional units matches a throughput (processing capacity) of a selected number of some but not all of the maximum possible number of the execution units (of the maximum possible number of the graphics processing units) operating in combination. (Thus, the throughput (processing capacity) of the functional unit is in an embodiment so as to produce an output of the processing operation at a rate that matches the rate at which the selected number of some but not all of the graphics processing units operating in combination (to generate the same data processing output) will (be able or expected to) consume that output and/or so as to consume an input of the processing operation at a rate that matches the rate at which the selected number of some but not all of the graphics processing units operating in combination (to generate the same data processing output) will (be able or expected to) produce that input.)

For example, the time that such a ("lower throughput") tiling unit is expected to take to prepare primitive lists for a typical frame is in an embodiment approximately equal to the time that the selected number of the execution units would be expected to take to perform vertex or fragment processing operations for that frame.

In this case, one of the at least one ("higher throughput") functional unit will in an embodiment be operated in combination with a set (partition) of one or more graphics processing units that comprises more than the selected number of execution units when generating a data processing output.

In the case of a set (partition) of one or more graphics processing units that comprises less than or equal to the selected number of execution units, one of the at least one ("higher throughput") functional unit may be operated in combination with the set, but in an embodiment one of the at least one other ("lower throughput") functional unit will be operated in combination with the set.

The selected number of execution units may be, for example, two, three, four, five, six, seven, eight or more execution units. Where each graphics processing unit comprises the same number of execution units, the selected number of execution units may be a positive integer times the number of execution units that each graphics processing unit comprises, for example one, two, three or more times the number of execution units that each graphics processing unit comprises.

Although the above mentions two different (maximum supported) throughputs (processing capacities), i.e. "higher" and "lower", it would be possible for the plurality of functional units to include more than two different throughput (processing capacity) functional units. Thus, there could be two or more, such as three or four, different throughput (processing capacity) functional units. In this case, the different possible throughputs (processing capacities) of the functional units may match throughputs (processing capacities) corresponding to different selected numbers of graphics processing units and/or execution units.

In an embodiment, however, there are only two different throughput (processing capacity) functional units. Thus, the (maximum supported) throughput (processing capacity) of each functional unit of the plurality of functional units is in an embodiment either a first throughput (processing capacity), or a second, lower throughput (processing capacity). In an embodiment, the plurality of functional units consists of (only comprises) the at least one ("higher throughput") functional unit and the at least one other ("lower throughput") functional unit. Having fewer possible throughputs (processing capacities) may decrease system complexity.

The plurality of functional units can be provided in any suitable and desired manner.

In an embodiment, the functional units are provided as part of respective graphics processing units. Thus, in an embodiment, each functional unit of the plurality of functional units is included in a respective (different) graphics processing unit of the plurality of graphics processing units. Only some, but in an embodiment all, of the graphics processing units may comprise a respective functional unit. (It will be appreciated here that where a graphics processing unit includes a functional unit, then that graphics processing unit will be able to, and can in an embodiment, operate on its own, as a "standalone" graphics processing unit. On the other hand, any graphics processing unit that does not itself include a functional unit may only be able to operate in combination with another graphics processing unit (that does include a functional unit).)

A functional unit included in a graphics processing unit may be provided as a separate circuit element to a set of execution units of the graphics processing unit, or the functional unit and set of execution units may share at least some processing circuitry. A functional unit included in a graphics processing unit may be connected to (and communicate via) the interconnect of the graphics processing unit.

In this case, the (maximum supported) throughput (processing capacity) of each functional unit should (at least) match the particular requirements of the graphics processing unit that the functional unit is included in. For example, where a graphics processing unit can operate in standalone mode but not master mode, it in an embodiment includes a "lowest throughput" functional unit, since in this case the functional unit may only at most need to match the throughput (processing capacity) of that single graphics processing unit operating independently.

On the other hand, where a graphics processing unit can operate in master mode, it may, and in an embodiment does, include a functional unit that has a (maximum supported) throughput (processing capacity) that depends on the maximum number of other (slave) graphics processing units it can control. For example and in an embodiment, a (and in an embodiment each) graphics processing unit that can control greater than a selected number of other graphics processing units includes a "higher throughput" functional unit, and a (and in an embodiment each) graphics processing unit that can only control less than or equal to the selected number of other graphics processing units includes a "lower throughput" functional unit. The selected number may be, for example, one, two or more other graphics processing units.

Thus, in an embodiment, the throughput (processing capacity) of each functional unit of the plurality of functional units is matched to a throughput (processing capacity) of the graphics processing unit that the respective functional unit is included in and (all of) any other graphics processing units of the plurality of graphics processing units that the graphics processing unit that the respective functional unit is included in can control.

For example, in the case of the graphics processing units being connected in a "daisy-chain" sequence, e.g. as discussed above, the first graphics processing unit in the sequence may, e.g., comprise a "highest throughput" functional unit, and be able to control the maximum possible number of other graphics processing units. Similarly, the last graphics processing unit in the sequence (that can operate in standalone mode) may, e.g., comprise a "lowest throughput" functional unit, and not be able to control any other graphics processing unit. This may, e.g., simplify verification scope for the system. (However, in general, there is no restriction on the choice of the capability of the units and their positions in the "daisy-chain" sequence.)

It will be appreciated that graphics processing units that are operating in slave mode may operate in combination with the functional unit included in the respective master graphics processing unit they are being controlled by. Accordingly graphics processing units that can only operate in slave mode do not need to include a respective functional unit. In an embodiment, therefore, any graphics processing unit that can only operate in slave mode does not comprise a respective functional unit. This can reduce the overall number of functional units, and thus silicon/hardware area costs.

In another embodiment, rather than each functional unit being included in a graphics processing unit, the plurality of functional units is provided in and as a pool of functional units that is in an embodiment external to (separate to) the plurality of graphics processing units. In this case, the system may be configured such that functional units can be assigned to partitions in use and as desired, for example under software control. For example, a first functional unit in the pool may assigned to a first set (partition) of one or more graphics processing units, while a second functional unit in the pool is assigned to a second set (partition) of one or more graphics processing units (and so on, if and as desired).

(It should be noted in this regard, that in this case, a set (partition) of one or more graphics processing units may only be operable to generate a data processing output when operating in combination with an (associated) functional unit (from the pool). Thus in this case, the graphics processing units may not be "complete" in themselves, but may require the operation of a functional unit as well.)

In this case, the functional units in the pool should, and in an embodiment do, have an (appropriate) distribution of (maximum supported) throughputs (processing capacities) so that the desired combinations of graphics processing units, e.g. each desired mode of operation, can be used and performed (with sufficient functional unit throughput (processing capacity) for each partition), e.g. as will be described below. The distribution of functional unit throughputs (processing capacities) in the pool is thus in an embodiment based on the throughputs (processing capacities) of the (desired/permitted) combinations of graphics processing units (modes of operation) that the system is intended to support.

In these embodiments, when a set (partition) of one or more graphics processing units is to generate a data output, a functional unit from the pool is in an embodiment selected for and allocated to that partition.

A functional unit (in the pool) is in an embodiment selected (in use) for a set (partition) of one or more graphics processing units based on a throughput (processing capacity) of the set (partition) of one or more graphics processing units when generating the data processing output (and the throughput (processing capacity) of the functional unit when performing the processing operation).

The functional unit to use may be selected based on the rate at which the set (partition) of one or more graphics processing units will consume an output of the functional unit processing operation (will need to be provided with the output of the functional unit processing operation (to avoid a bottleneck)) when generating the data processing output (and the rates at which the different functional units will produce the output of the functional unit processing operation when performing the processing operation) and/or based on the rate at which the set (partition) of one or more graphics processing units will produce an input of the functional unit processing operation (to avoid a bottleneck) when generating the data processing output (and the rates at which the different functional units will consume the input of the functional unit processing operation when performing the processing operation).

For example, a "higher throughput" functional unit is in an embodiment selected for a partition that includes a relatively large number of graphics processing units (and/or execution units), and a "lower throughput" functional unit is in an embodiment selected for a partition that includes a relatively small number of graphics processing units (and/or execution units).

This operation can be achieved in any suitable and desired manner. In an embodiment, the system comprises a configurable interconnect that can route communications between functional units in the pool and graphics processing units, and a (the) control circuit that can select a functional unit in the pool based on a throughput (processing capacity) of a set (partition) of one or more graphics processing units, and can configure the configurable interconnect to route communications between the selected functional unit and the set (partition) of one or more graphics processing units appropriately.

As discussed above, each of the at least one ("higher throughput") functional unit would typically occupy a greater silicon area than each of the at least one other ("lower throughput") functional unit. Accordingly, the overall hardware/silicon area costs associated with the plurality of functional units should be, and in an embodiment is, less than that which would be required were all of the functional units to be ("higher throughput") functional units, e.g. that can match a throughput (processing capacity) of the maximum possible number of (e.g. all of) the graphics processing units operating in combination.

In an embodiment, the number of "higher throughput" functional units is minimised, e.g. so as to minimise the hardware/silicon costs associated with "higher throughput" functional units. This can be achieved in any suitable and desired manner.

In an embodiment, the number of modes of operation in which the system can operate is limited such that the number of "higher throughput" functional units that are required in order to be able to operate in each of those modes is less than the number of "higher throughput" functional units that would be required were more modes of operation possible.

Thus, in an embodiment, the plurality of graphics processing units can be partitioned (by the control circuit) in accordance with (only) each mode of operation of a selected, in an embodiment restricted, set of plural different modes of operation. The selected set of plural different modes of operation is in an embodiment selected (restricted) such that the number of "higher throughput" functional units that are required in order to be able to operate in each of the modes of operation (with sufficient functional unit throughput (processing capacity) for each partition) is less than the number of "higher throughput" functional units that would be required were more modes of operation to be allowed (included in the selected set).

Correspondingly, the (maximum supported) throughput (processing capacity) of each functional unit of the plurality of functional units is in an embodiment selected based on possible modes of operation, e.g. based on the selected set of plural different modes of operation. The selection of throughputs (processing capacities) is in an embodiment such that all of the modes of operation (of the selected set of plural different modes of operation) can be operated in with sufficient functional unit throughput (processing capacity) for each partition, i.e. such that in each mode of operation, each set (partition) of one or more graphics processing units will operate in combination with a functional unit of the plurality of functional units that has a sufficient throughput (processing capacity) for that set (partition) of one or more graphics processing units.

In an embodiment, the minimum possible functional unit throughputs (processing capacities) that permit all of the modes of operation (of the selected set of plural different modes of operation) to be operated in with sufficient functional unit throughput (processing capacity) for each partition are selected.

It is believed the idea of selecting and providing different functional unit throughputs (processing capacities) in this manner may be novel and inventive in its own right.

Another embodiment of the technology described herein comprises a method of providing a data processing system that comprises a plurality of graphics processing units, and a plurality of functional units configured to perform the same processing operation, the method comprising:

providing the plurality of graphics processing units, wherein one or more of the graphics processing units are operable in combination with at least one other graphics processing unit of the plurality of graphics processing units;

providing a control circuit configured to partition the plurality of graphics processing units into one or more sets of one or more graphics processing units in accordance with a mode of operation of a selected set of plural different modes of operation, such that each set of one or more graphics processing units is operable to generate a data processing output; and providing the plurality of functional units, each functional unit operable in combination with a set of one or more of the graphics processing units when generating a data processing output, and wherein the throughput of at least one functional unit of the plurality of functional units when performing the processing operation is greater than the throughput of at least one other functional unit of the plurality of functional units when performing the processing operation;

wherein providing the plurality of functional units comprises selecting the throughputs of the functional units when performing the processing operation based on the selected set of plural different modes of operation.

Another embodiment of the technology described herein comprises a method of providing a data processing system that comprises a plurality of graphics processing units, and a plurality of functional units configured to perform the same type of processing operation, the method comprising:

providing the plurality of graphics processing units, wherein one or more of the graphics processing units are operable in combination with at least one other graphics processing unit of the plurality of graphics processing units;

providing a control circuit configured to partition the plurality of graphics processing units into one or more sets of one or more graphics processing units in accordance with a mode of operation of a selected set of plural different modes of operation, such that each set of one or more graphics processing units is operable to generate a data processing output; and providing the plurality of functional units, each functional unit operable in combination with a set of one or more of the graphics processing units when generating a data processing output, and wherein the processing capacity of at least one functional unit of the plurality of functional units for performing the processing operation is greater than the processing capacity of at least one other functional unit of the plurality of functional units for performing the processing operation;
wherein providing the plurality of functional units comprises selecting the processing capacities of the functional units for performing the processing operation based on the selected set of plural different modes of operation.

These embodiments can include, as appropriate, any one or more or all of the optional features described herein.

The functional units can be any suitable functional unit that can perform any suitable processing operation when operating in combination with the graphics processing units when generating a data processing output.

In an embodiment, each functional unit is a fixed-function unit or accelerator, i.e. a circuit that is dedicated to one or more fixed-functions (i.e. functions that cannot be changed).

In an embodiment, each functional unit is a memory management unit (MMU), the processing operation is in an embodiment a memory management operation, such as memory address translation, an input of the processing operation may be a memory address, and an output of the processing operation may be a translated memory address. In this case, (a functional unit operating in combination with a set of one or more of the graphics processing units when) generating a data processing output in an embodiment comprises one of the memory management units (MMUs) performing one or more memory management operations, e.g. to generate one or more translated memory addresses, and execution units of a set (partition) of one or more graphics processing units performing processing operations using an output of the memory management operation, e.g. one or more translated memory addresses, for example when reading data from, or writing data to, an external memory.

In another embodiment, each functional unit is a (task) management circuit (e.g. job manager), and the processing operation is dividing (processing) tasks into subtasks and distributing the subtasks to execution units. In this case, (a functional unit operating in combination with a set of one or more of the graphics processing units when) generating a data processing output in an embodiment comprises one of the management circuits dividing tasks into subtasks and distributing the subtasks to execution units of a set (partition) of one or more graphics processing units, and the execution units performing the distributed subtasks.

As already mentioned, in an embodiment, each functional unit is a tiling unit (a tiler), the processing operation is in an embodiment preparing primitive lists for tile-based rendering, an input of the processing operation is processed vertex data, and an output of the processing operation is in an embodiment a set of geometry (e.g. primitive) lists for respective regions (areas) of the output being generated. Thus, in an embodiment, the data processing system is a tile-based graphics processing system, and each graphics processing unit is a tile-based graphics processing unit.

In this case, (a functional unit operating in combination with a set of one or more of the graphics processing units when) generating a data processing output in an embodiment comprises execution units of a set (partition) of one or more graphics processing units performing vertex processing operations to generate processed vertex data, one of the tiling units preparing output region geometry (e.g. primitive) lists using the processed vertex data, and in an embodiment the execution units of the set (partition) of one or more graphics processing units performing fragment processing operations using the geometry (e.g. primitive) lists prepared by the tiling unit.

In an embodiment, the vertex processing and geometry (e.g. primitive) lists preparation operations are effectively combined. For example, and in an embodiment, a tiling unit distributes vertex processing tasks to execution units to generate processed vertex data that the tiling unit uses to prepare geometry (e.g. primitive) lists. In this case, each tiling unit may be effectively operable as a task management circuit, e.g. and in an embodiment, as described above. Other arrangements would be possible.

It is believed that the idea of tiling units have different (maximum supported) tiling throughputs (processing capacities) in the context of graphics processing systems that include a plurality of combinable graphics processing units may be novel and inventive in its own right.

Thus, another embodiment of the technology described herein comprises a graphics processing system comprising:
a plurality of graphics processing units, each operable to perform tile-based rendering and wherein two or more of the graphics processing units are operable in combination with at least one other graphics processing unit of the plurality of graphics processing units; and
a plurality of tiling units;
wherein the throughput of at least one tiling unit of the plurality of tiling units is greater than the throughput of at least one other tiling unit of the plurality of tiling units.

Another embodiment of the technology described herein comprises a method of operating a graphics processing system that comprises:
a plurality of graphics processing units, each operable to perform tile-based rendering and wherein two or more of the graphics processing units are operable in combination with at least one other graphics processing unit of the plurality of graphics processing units; and
a plurality of tiling units;
wherein the throughput of at least one tiling unit of the plurality of tiling units is greater than the throughput of at least one other tiling unit of the plurality of tiling units;
the method comprising:
one of the tiling units operating in combination with one or more graphics processing units of the plurality of graphics processing units when generating a render output.

Another embodiment of the technology described herein comprises a graphics processing system comprising:
a plurality of graphics processing units, each operable to perform tile-based rendering and wherein two or more of the graphics processing units are operable in combination with at least one other graphics processing unit of the plurality of graphics processing units; and
a plurality of tiling units;
wherein the processing capacity of at least one tiling unit of the plurality of tiling units is greater than the processing capacity of at least one other tiling unit of the plurality of tiling units.

Another embodiment of the technology described herein comprises a method of operating a graphics processing system that comprises:
a plurality of graphics processing units, each operable to perform tile-based rendering and wherein two or more of the graphics processing units are operable in combination with at least one other graphics processing unit of the plurality of graphics processing units; and
a plurality of tiling units;
wherein the processing capacity of at least one tiling unit of the plurality of tiling units is greater than the processing capacity of at least one other tiling unit of the plurality of tiling units;

the method comprising:

one of the tiling units operating in combination with one or more graphics processing units of the plurality of graphics processing units when generating a render output.

These embodiments can include, as appropriate, any one or more or all of the optional features described herein. For example, the one or more graphics processing units may generate processed vertex data that the tiling unit uses to prepare primitive lists, and the one or more graphics processing units of the plurality of graphics processing units may use the prepared primitive lists when generating the render output. Similarly, a set of one or more graphics processing units will in an embodiment be configured to generate the render output (data processing output), and a tiling unit (functional unit) of the plurality of tiling units will in an embodiment be configured to prepare the output region geometry (e.g. primitive) lists. A set of one or more graphics processing units will in an embodiment operate in combination with a tiling unit of the plurality of tiling units that has a throughput (processing capacity) that is sufficient to match (and that is in an embodiment selected based on) a throughput (processing capacity) of the set of one or more graphics processing units.

In an embodiment, as well as having functional units with different (maximum supported) throughputs (processing capacities), it would also be possible for the graphics processing units to include graphics processing units with different capabilities, such as, and in an embodiment in terms of their performance, and in an embodiment throughput (processing capacity), when performing a data processing operation. For example, and in an embodiment, different graphics processing units could have different numbers of execution units (shader cores). This may then provide further flexibility in terms of the operating modes that can be supported, whilst still facilitating a reduction in silicon area (for example).

Thus, in an embodiment, the plurality of graphics processing units includes one or more graphics processing units that have higher performance than other graphics processing units in the plurality of graphics processing units, and in an embodiment includes one or more graphics processing units that have more execution units (shader cores) than other graphics processing units in the plurality of graphics processing units. For example each graphics processing unit could have from 1 to 3 execution units (shader cores).

In an embodiment, the functional unit throughputs (processing capacities) and the numbers of execution units in different graphics processing units are selected so that the desired combinations of graphics processing units and functional units, e.g. each desired mode of operation, can be used and performed (with functional unit and graphics processing unit throughputs (processing capacities) matched for each partition). The distribution of functional unit throughputs (processing capacities) and the distribution of numbers of execution units is thus in an embodiment based on the throughputs (processing capacities) of the (desired/permitted) combinations of graphics processing units and functional units (modes of operation) that the system is intended to support.

As well as the graphics processing units, functional units, etc., necessary for operation in the manner of the technology described herein, the data (graphics) processing system may otherwise include any other suitable and desired components, elements, units, etc., that a data processing system may comprise.

Thus, the data processing system may, e.g., include one or more peripheral devices, such as one or more output devices (e.g. display screens, vehicle controllers, etc.) and/or one or more input devices (e.g. human-computer interfaces, vehicle sensors, etc.).

The overall data processing system in an embodiment includes appropriate (system) memory for storing the data used by the graphics processing units and/or functional units when carrying out processing and/or for storing the data generated by the graphics processing units and/or functional units as a result of carrying out processing. Different groups of graphics processing units and/or functional units may be configured to be connected to the same (system) memory, or separate system memories may be provided for different groups.

Correspondingly, different groups of the graphics processing units and/or functional units may be connected to the external system memory via the same or different memory interconnects.

In an embodiment, the data processing system includes one or more host data processing units (processors) (e.g. central processing units). One or more virtual machines may execute on the host processors. In an embodiment, one or more drivers for the graphics processing units execute on the host processors.

In an embodiment, the data processing system and/or data and/or graphics processing units and/or functional units comprise, and/or are in communication with, one or more memories and/or memory devices that store the data described herein, and/or that store software for performing the processes described herein.

The technology described herein can be used for all forms of data processing output that graphics processing units may output. Thus, it may be used when generating frames for display, render-to-texture outputs, etc. However, the technology described herein can equally be used where the graphics processing units are to be used to provide other processing and operations and data processing outputs, for example that may not be or may not relate to a display or images. For example, the technology described herein can equally be used for non-graphics use cases such as ADAS (Advanced Driver Assistance Systems) which may not have a display and which may deal with input data (e.g. sensor data, such as radar data) and/or output data (e.g. vehicle control data) which is not related to images. Similarly, a data processing output may be compute data for image recognition or neutral network applications. In general, the technology described herein can be used for any desired graphics processor data processing operations, such as GPGPU (general purpose GPU) operations.

In one embodiment, the various functions of the technology described herein are carried out on a single system on chip (SoC) data processing system.

Although the above has been described with particular reference to functional units operating in combination with graphics processing units, the technology described herein extends more generally to functional units operating in combination with other (programmable) processing units, such as central processing units (CPUs), video processing units, neural network processing units, etc.

Thus, another embodiment of the technology described herein comprises a data processing system comprising:

a plurality of processing units, wherein one or more of the processing units are operable in combination with at least one other processing unit of the plurality of processing units such that respective sets of one or more processing units of the plurality of processing units can generate respective data processing outputs; and a plurality of functional units configured to perform the same processing operation, each functional unit operable in combination with a set of one or more of the processing units when generating a data processing output;

wherein the throughput of at least one functional unit of the plurality of functional units when performing the processing operation is greater than the throughput of at least one other functional unit of the plurality of functional units when performing the processing operation.

Another embodiment of the technology described herein comprises a method of operating a data processing system that comprises:

a plurality of processing units, wherein one or more of the processing units are operable in combination with at least one other processing unit of the plurality of processing units such that respective sets of one or more processing units of the plurality of processing units can generate respective data processing outputs; and a plurality of functional units configured to perform the same processing operation, each functional unit operable to in combination with a set of one or more of the processing units when generating a data processing output;

wherein the throughput of at least one functional unit of the plurality of functional units when performing the processing operation is greater than the throughput of at least one other functional unit of the plurality of functional units when performing the processing operation;

the method comprising:

configuring a set of one or more processing units of the plurality of processing units to generate a data processing output;

configuring a functional unit of the plurality of functional units that has a throughput when performing the processing operation that is sufficient to match a throughput of the set of one or more processing units when generating a data processing output to operate in combination with the set of one or more processing units when generating the data processing output; and the functional unit performing the processing operation when operating in combination with the set of one or more processing units when generating the data processing output.

Another embodiment of the technology described herein comprises a method of providing a data processing system that comprises a plurality of processing units, and a plurality of functional units configured to perform the same processing operation, the method comprising:

providing the plurality of processing units, wherein one or more of the processing units are operable in combination with at least one other processing unit of the plurality of processing units;

providing a control circuit configured to partition the plurality of processing units into one or more sets of one or more processing units in accordance with a mode of operation of a selected set of plural different modes of operation, such that each set of one or more processing units is operable to generate a data processing output; and providing the plurality of functional units, each functional unit operable in combination with a set of one or more of the processing units when generating a data processing output, and wherein the throughput of at least one functional unit of the plurality of functional units when performing the processing operation is greater than the throughput of at least one other functional unit of the plurality of functional units when performing the processing operation;

wherein providing the plurality of functional units comprises selecting the throughputs of the functional units when performing the processing operation based on the selected set of plural different modes of operation.

Another embodiment of the technology described herein comprises a data processing system, comprising:

a plurality of processing units, wherein one or more of the processing units are operable in combination with at least one other processing unit of the plurality of processing units such that respective sets of one or more processing units of the plurality of processing units can generate respective data processing outputs; and a plurality of functional units configured to perform the same type of processing operation, each functional unit operable in combination with a set of one or more of the processing units when generating a data processing output;

wherein the processing capacity of at least one functional unit of the plurality of functional units for performing the processing operation is greater than the processing capacity of at least one other functional unit of the plurality of functional units for performing the processing operation.

Another embodiment of the technology described herein comprises a method of operating a data processing system that comprises:

a plurality of processing units, wherein one or more of the processing units are operable in combination with at least one other processing unit of the plurality of processing units such that respective sets of one or more processing units of the plurality of processing units can generate respective data processing outputs; and a plurality of functional units configured to perform the same type of processing operation, each functional unit operable in combination with a set of one or more of the processing units when generating a data processing output;

wherein the processing capacity of at least one functional unit of the plurality of functional units for performing the processing operation is greater than the processing capacity of at least one other functional unit of the plurality of functional units for performing the processing operation;

the method comprising:

configuring a set of one or more processing units of the plurality of processing units to generate a data processing output;

configuring a functional unit of the plurality of functional units that has a processing capacity for performing the processing operation that is sufficient to match a processing capacity of the set of one or more processing units for generating a data processing output to operate in combination with the set of one or more processing units when generating the data processing output; and the functional unit performing the processing operation when operating in combination with the set of one or more processing units when generating the data processing output.

Another embodiment of the technology described herein comprises a method of providing a data processing system that comprises a plurality of processing units and a plurality of functional units configured to perform the same type of processing operation, the method comprising:

providing the plurality of processing units, wherein one or more of the processing units are operable in combination with at least one other processing unit of the plurality of processing units;

providing a control circuit configured to partition the plurality of processing units into one or more sets of one or more processing units in accordance with a mode of operation of a selected set of plural different modes of operation, such that each set of one or more processing units is operable to generate a data processing output; and providing the plurality of functional units, each functional unit operable in combination with a set of one or more of the processing units when generating a data processing output, and wherein the processing capacity of at least one functional unit of the plurality of functional units for performing the processing operation is greater than the processing capacity of at least one other functional unit of the plurality of functional units for performing the processing operation;

wherein providing the plurality of functional units comprises selecting the processing capacities of the functional units for performing the processing operation based on the selected set of plural different modes of operation.

As will be appreciated by those skilled in the art, these embodiments of the technology described herein can and in an embodiment do include one or more, and in an embodiment all, of the optional features of the technology described herein described herein, as appropriate.

Thus, for example, each processing unit is in an embodiment a programmable processing unit, and in an embodiment comprises one or more programmable circuits that can be programmed to perform desired processing operations. For example, each processing unit in an embodiment comprises one or more execution units, each of which can execute program instructions to perform processing operations indicated by the program instructions.

The processing units may be any suitable and desired form of processing units. In an embodiment, they are processing units that are intended to perform particular forms of processing operation. In an embodiment, the processing units are (all) configured to perform graphics processing operations. Correspondingly, the execution units are in an embodiment (all) configured to perform graphics processing operations, e.g. and in an embodiment, they are (all) shader cores. Thus the processing units are in an embodiment graphics processors, and in an embodiment as discussed above, graphics processing units. In other embodiments, however, the processing units may be other forms of processing unit, such as central processing units (CPUs), video processing units, neural network processing units, etc.

The functional units may be any suitable and desired form of functional units that are appropriate to the processing units in question. Each functional unit is in an embodiment a fixed-function unit or accelerator. Thus, each (fixed-function) functional unit is in an embodiment dedicated to performing the processing operation to e.g. generate an appropriate output for use by (execution units of) one or more of the (programmable) processing units or consume an appropriate input generated by (execution units of) the one or more of the (programmable) processing units (when executing program instructions to generate the data processing output).

In an embodiment, the (executions units of the) processing units are configured to perform plural processing tasks in parallel (independently and at the same time), and the functional units in an embodiment perform a function that is not conducive to such parallelisation. For example, each functional in an embodiment divides an overall processing task into sub-tasks, and distributes sub-tasks to plural execution units that are in an embodiment to perform sub-tasks in parallel (independently and at the same time). Thus, the processing operation may be dividing (processing) tasks into subtasks and distributing the subtasks to execution units for execution in parallel.

As discussed above, in the case of the processing units being graphics processors (graphics processing units), the functional units may be tiling units, (task) management circuits, etc. In the case of the processing units being video processing units, the functional units may be, for example, (task) management circuits, discrete cosine transform (DCT) units, etc. In other embodiments, the functional units may be Direct Memory Access (DMA) controllers or memory data compression/decompression units (codecs).

Although the above has generally been described with reference to functional units that can perform a single processing operation, it will be appreciated that a functional unit may also be able to perform other processing operations. A plurality of functional units may, for example, be configured to perform the same set of one or more processing operations. Although the above has generally been described with reference to a system comprising a single plurality of functional units that are all of the same type, the system may comprise other types of functional units. The system may, for example, comprise plural different pluralities of functional units, each plurality of functional units comprising functional units that are all of the same type. In this case, one or more, and in an embodiment each, plurality of functional units may be arranged and operate in accordance with the technology described herein.

The technology described herein can be implemented in any suitable system, such as a suitably operable microprocessor based system. In some embodiments, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, the various functional elements, stages, units, and "means" of the technology described herein may comprise a suitable processor or processors, controller or controllers, functional units, circuitry, circuits, processing logic, microprocessor arrangements, etc., that are operable to perform the various functions, etc., such as appropriately dedicated hardware elements (processing circuits/circuitry) and/or programmable hardware elements (processing circuits/circuitry) that can be programmed to operate in the desired manner.

It should also be noted here that the various functions, etc., of the technology described herein may be duplicated and/or carried out in parallel on a given processor. Equally, the various processing stages may share processing circuits/circuitry, etc., if desired.

Furthermore, any one or more or all of the processing stages or units of the technology described herein may be embodied as processing stage or unit circuits/circuitry, e.g., in the form of one or more fixed-function units (hardware) (processing circuits/circuitry), and/or in the form of programmable processing circuitry that can be programmed to perform the desired operation. Equally, any one or more of the processing stages or units and processing stage or unit circuits/circuitry of the technology described herein may be provided as a separate circuit element to any one or more of the other processing stages or units or processing stage or unit circuits/circuitry, and/or any one or more or all of the processing stages or units and processing stage or unit circuits/circuitry may be at least partially formed of shared processing circuit/circuitry.

It will also be appreciated by those skilled in the art that all of the described embodiments of the technology described herein can include, as appropriate, any one or more or all of the optional features described herein.

The methods in accordance with the technology described herein may be implemented at least partially using software e.g. computer programs. Thus, further embodiments of the technology described herein comprise computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus further embodiments of the technology described herein comprise computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre-loaded with a computer system, for example, on a system ROM or fixed disk, or distributed from a server or electronic bulletin board over a network, for example, the Internet or World Wide Web.

As discussed above, data processing systems such as graphics processing systems may typically make use of various functional units, such as tiling units, when generating data processing outputs, such as frames for display. For example, in a tile-based graphics processing system, generating a render output, e.g. frame, will typically comprise a set of execution units (shader cores) of a graphics processing unit (GPU) performing vertex processing operations to generate processed vertex data, a tiling unit preparing a set of primitive lists using the processed vertex data, and then the set of execution units (shader cores) of the graphics processing unit (GPU) performing fragment processing operations using the prepared primitive lists. In this case, to ensure efficient render output generation, the throughput (processing capacity) of the tiling unit will be matched to the throughput (processing capacity) of the set of execution units (shader cores), e.g. to avoid a "bottleneck". For example, the time that the tiling unit is expected to take to prepare primitive lists for a typical frame will be approximately equal to the time that the set of execution units is expected to take to perform vertex or fragment processing operations for that frame.

The technology described herein relates to data processing systems that include plural connected graphics processing units, and in which different sets of one or more of those graphics processing units, i.e. different "partitions", can operate independently of each other. Such a data processing system may be particularly suited to automotive applications, for example. For example, a respective partition may be assigned for each of one or more of: a display screen for the main instrument console, an additional navigation and/or entertainment screen, and an Advanced Driver Assistance System (ADAS) of a vehicle, etc.

Such systems will typically comprise plural of the same functional unit, e.g. plural tiling units, so that each partition is able to make use of one of the functional units independently of the other partition(s).

The Applicants have recognised that in such a data processing system, the throughput (processing capacity) associated with a partition will be variable; for example, it will depend on the number of graphics processing units that make up a partition. Moreover, maximum possible system throughput (processing capacity) will typically only be achievable when e.g. all of the graphics processing units are combined into a single partition.

The Applicants have recognised that this means that it is not necessary for all of the plural functional units, e.g. tiling units, in such a data processing system to have a (maximum supported) throughput (processing capacity) that can match the maximum possible system throughput (processing capacity). Rather, and as will be discussed in more detail below, it is possible to provide one or more of the functional units, e.g. tiling units, having a reduced processing capacity (throughput). This can lead to a reduction in the overall hardware/silicon area costs associated with the plural functional units, e.g. tiling units, and thus provide a more efficient data processing system.

FIG. 1 shows a data processing system 9 in accordance with an embodiment that includes a host processor 1 and a set of plural connected graphics processing units 3. It will be appreciated that FIG. 1 is only schematic, and the system may include other units and components not shown in FIG. 1.

In the present embodiment, the host processor 1 is a central processing unit (CPU) that directly executes an application 2 and a driver 4 for the graphics processing units 3. In other embodiments, however, the application and driver may be executed by a virtual machine that is executing on host processor 1.

As shown in FIG. 1, in this embodiment, the set of graphics processing units 3 comprises a pair of connected graphics processing units (GPUs) 10, 11 that can communicate with each other. The connected graphics processing units 10, 11 can be operated in different modes, namely either as "standalone" graphics processing units, or as a linked set of a primary (master) and a secondary (slave) graphics processing unit.

In use of this system, the application 2 will require graphics processing operations to be performed by one or both of the graphics processing units 10, 11. To do this, the application 2 will generate API (Application Programming Interface) calls that are interpreted by the driver 4 to generate appropriate commands to the set of graphics processing units 3 to generate the graphics output required by the application 2.

The driver 4 will then send (e.g. commands and data for) the relevant graphics processing tasks to the set of graphics processing units 3 for processing by one or both of the graphics processing units 10, 11 to generate the desired data processing output.

A data processing output may typically be an output frame intended for display on a display device, such as a screen or printer, but may also, for example, comprise intermediate render data intended for use in later rendering passes (also known as a "render to texture" output), etc. Moreover, as discussed above, a data processing output need not relate to a display or images. For example, the data processing output may be vehicle control data for an ADAS (Advanced Driver Assistance System) or compute data for image recognition or neural network applications.

In the present embodiment, the system is configurable such that each GPU 11 can be either operated in a standalone mode or linked up with the other GPU to work cooperatively on a given task. The GPU link mechanism is implemented in hardware and is transparent to the host processor 1 (to software), such that linked GPUs appear as a single (larger) GPU to the host software (e.g. driver 4).

In standalone mode, a GPU operates independently, e.g. under direct control from the host processor 1. In linked operation, one of the GPUs operates in a master mode and the other GPU operates in a slave mode. In master mode the GPU controls the other GPU operating in slave mode, and provides the software interface (the host processor interface) for the linked set of GPUs. In slave mode, the GPU operates under control of the master GPU. The arrangement and operation of the GPUs is in an embodiment as described in US 2017/0236244.

This allows the set of graphics processing units 3 to be used in different situations, either as effectively two separate GPUs executing different functions, or with the GPUs linked to execute a single function with higher performance. For example, one GPU may operate as a first partition and generate a frame for display on a first display, e.g. under the control of a first application, while the other GPU is operating as a second, independent partition that is generating a different frame for display on a different display, e.g. under the control of a second, different application. Alternatively, both GPUs may operate in combination as a single partition to generate the same frame for display on a single display, e.g. under the control of a single application.

Figure 2:
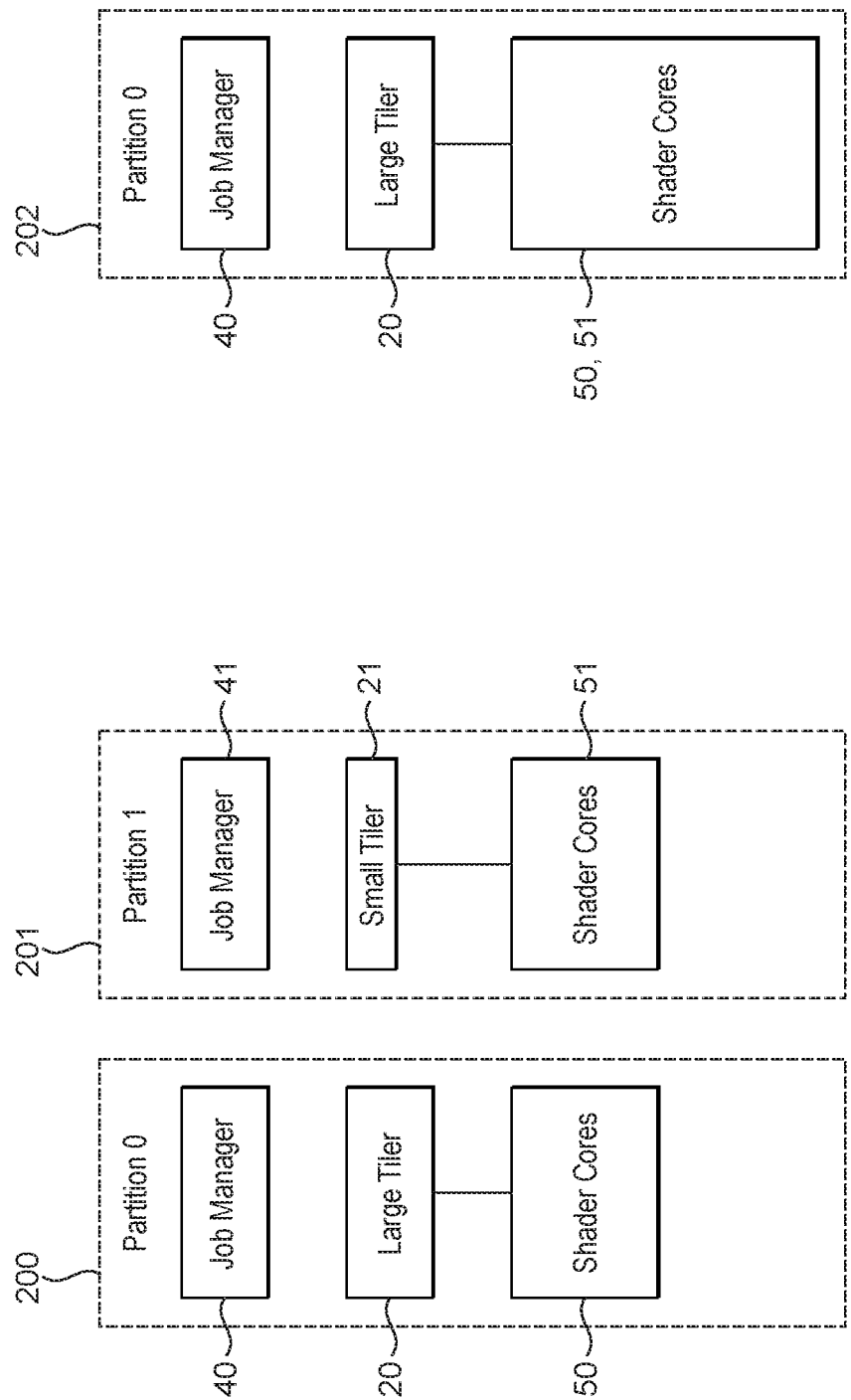
FIGS. 2A and 2B show schematically the data processing system of FIG. 1 operating in accordance with embodiments of the technology described herein.

FIG. 2 illustrates this: FIG. 2A illustrates both GPUs 10, 11 operating in standalone mode, and FIG. 2B illustrates linked mode. As shown in FIG. 2A, in the standalone mode case, the first GPU 10 acts as a first partition 200, and the second GPU 11 acts as a second partition 201.

As shown in FIG. 2A, each GPU 10, 11 includes a (task) management circuit in the form of a job manager 40, 41 that provides the software interface for the respective partition, and thus receives tasks (commands and data) from a driver, and divides a task given by the driver into subtasks and distributes the subtasks for execution to a respective tiling unit 20, 21 and set of shader cores 50, 51. Both job managers 40, 41 may receive tasks from the same driver 4, or there could be a different driver for each partition. Where there are different drivers, the different drivers may execute on the same host processor 1 (or virtual machine), or they could execute on different host processors (or virtual machines).

In this case, each tiling unit 20, 21 operates in combination with the respective set of shader cores 50, 51 of the respective GPU 10, 11. In the present embodiment, this involves a tiling unit distributing vertex processing tasks to the associated set of shader cores to generate processed vertex data that the tiling unit uses to prepare primitive lists, the tiling unit providing the prepared primitive lists to the set of shader cores, and the shader cores using the prepared primitives lists when performing fragment processing operations.

FIG. 2B illustrates the case where both GPUs 10, 11 act in combination as a single partition 202. In the present embodiment, the first GPU 10 can only operate in standalone or master modes of operations, while the second GPU 11 can only operate in standalone or slave modes of operation. Accordingly, in FIG. 2B, the first GPU 10 is acting as the master (primary) graphics processing unit, while the second GPU 11 is acting as a slave (secondary) graphics processing unit.

In this case, the job manager 40 of the first, master graphics processing unit 10 provides the software interface for both GPUs 10, 11, and thus receives tasks from a driver, and distributes subtasks to both sets of shader cores 50, 51. The job manager 41 of the second, slave GPU 11 is accordingly disabled. Similarly, in this mode of operation, the tiling unit 20 of the first, master GPU 10 will operate in combination with both sets of shader cores 50, 51, while the tiling unit 21 of the second, slave GPU 11 is disabled.

Thus, the tiling unit 20 of the first GPU 10 will operate in combination with a single set of shader cores 50 in standalone mode, or will operate in combination with both sets of shader cores 50, 51 in master mode. The tiling unit 21 of the second GPU 11, however, will operate in combination with a single set of shader cores 51 in standalone mode, or will be disabled in slave mode.

The tiling unit 20 of the first GPU 10 will accordingly need to be provided with a processing throughput (capacity) that is sufficient to prepare primitive lists at a fast enough rate for operating in combination with both sets of shader cores 50, 51 combined, while the tiling unit 21 of the second GPU 11 will only need to be provided with a processing throughput (capacity) that is sufficient to prepare primitive lists at a fast enough rate for operating in combination with one of the sets of shader cores 51.

Accordingly, the tiling unit 21 of the second GPU 11 is provided with a smaller (maximum) processing throughput (capacity) than the tiling unit 20 of the first GPU 10. As illustrated in FIG. 2A, this means that the tiling unit 21 of the second GPU 11 can occupy a smaller silicon area than the tiling unit 20 of the first GPU 10. Accordingly, overall hardware/silicon area costs can be reduced.

Figure 3:
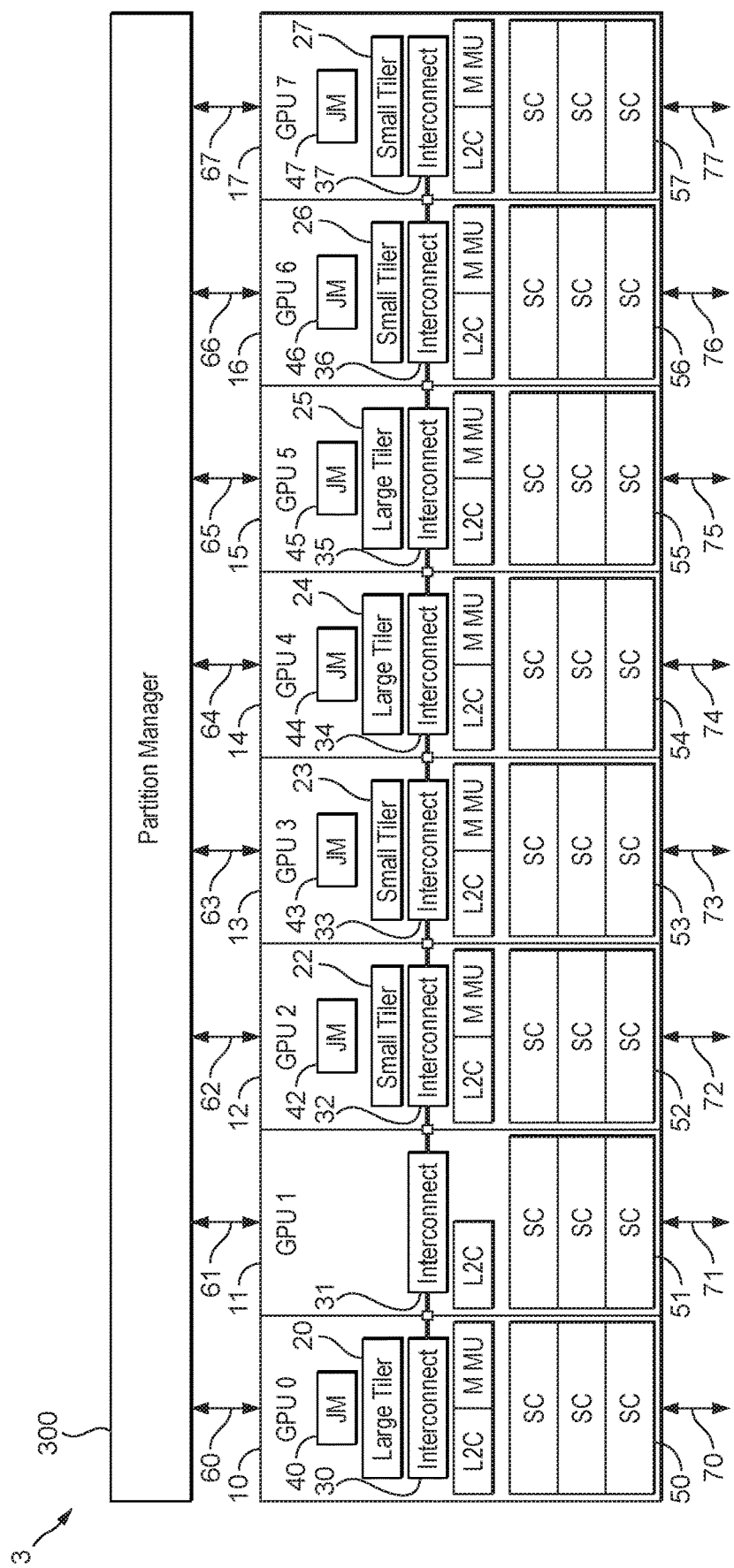
FIG. 3 shows schematically and in more detail a data processing system in accordance with an embodiment of the technology described herein.

FIG. 3 illustrates an embodiment which will now be discussed in greater detail. In this embodiment, the set of graphics processing units 3 includes eight connected tile-based graphics processing units 10-17. It will be appreciated here that FIG. 3 is only schematic, and the system may include other units and components not shown in FIG. 3.

In tile-based rendering, rather than the entire render output, e.g., frame, effectively being processed in one go as in immediate mode rendering, the render output, e.g., frame to be displayed, is divided into a plurality of smaller sub-regions, usually referred to as "tiles". Each tile (sub-region) is rendered separately (e.g. one-after-another), and the rendered tiles (sub-regions) are then recombined to provide the complete render output, e.g., frame for display. In such arrangements, the render output is typically divided into regularly-sized and shaped sub-regions (tiles) (which are usually, e.g., squares or rectangles), but this is not essential.

An advantage of such tile-based rendering is that graphics processing commands (primitives) that do not apply to a given tile do not have to be processed for that tile, and therefore can be ignored when the tile is processed. This can allow the overall amount of graphics processing necessary for a given render output to be reduced. Moreover, external memory bandwidth can be significantly decreased, since, e.g., temporal and spatial locality is significantly increased.

In a tile-based rendering system, it is accordingly usually desirable to be able to identify and know the geometry (e.g. primitives) that actually applies to a given rendering tile so as to, e.g., avoid unnecessarily processing geometry (primitives) that does not actually apply to a tile.

In order to facilitate this, in the present embodiment, as shown in FIG. 3, graphics processing units include respective tiling units 20, 22-27 that are each operable to prepare lists of the geometry (e.g. primitives) to be processed for different regions of a render output. These "primitive lists" (which can also be referred to as "tile lists" or "polygon lists") identify (e.g. by reference to a primitive indicator) the geometry (e.g. primitives) to be processed for the region in question. The regions of the render output that primitive lists can be prepared for can correspond e.g. to single rendering tiles, or to sets of plural rendering tiles.

The primitive list preparation process uses processed vertex data that is generated by processing vertex data for the primitives. This vertex processing may include transforming attributes for each vertex into a desired form for the primitive listing and subsequent graphics processing operations. This may comprise, for example, transforming vertex position attributes from the world or user space that they are initially defined for to the screen space that the output of the graphics processing system is to be displayed in.

Once the primitive lists have been prepared for the render output regions, each rendering tile may then be processed by processing the geometry (e.g. rasterising the primitives) listed for the region(s) that encompass the rendering tile, e.g. to generate graphics fragments for processing. The so-generated graphics fragments may then be subjected to appropriate fragment processing operations.

This fragment processing may include any suitable and desired fragment shading (rendering) processes, such as executing fragment shader programs on the fragments, applying textures to the fragments, applying fogging or other operations to the fragments, etc., to generate the appropriate fragment data.

In order to facilitate vertex and fragment processing, in the present embodiment, as shown in FIG. 3, each graphics processing unit 10-17 comprises a respective set of execution units, which in this embodiment is in the form of a set of shader cores (SC) 50-57. Each graphics processing unit in this embodiment comprises a set of three shader cores. However, other numbers of shader cores would be possible.

Each shader core is an execution unit that can perform graphics processing operations by executing instructions of a vertex or fragment shader program for graphics "work" items in a render output, which in this case may be vertices or fragments. This generally enables a high degree of parallelism, in that a typical render output, e.g. frame, features a rather large number of vertices or fragments, each of which can be processed independently.

Shaded fragments may be subjected to various further processes, such as depth testing, blending, dither, etc., if desired.

Finally, output fragment data (values) is written to local L2 cache (L2C). The output data can then be output from L2 cache (L2C) to a frame buffer in an external memory for display, via a memory interface 70-77 under the control of a memory management unit (MMU).

Once a tile of the render output has been processed and its data exported to external memory, the next tile is then processed, and so on, until sufficient tiles have been processed to generate the entire render output (e.g. frame (image) to be displayed). The process is then repeated for the next render output (e.g. frame) and so on.

As shown in FIG. 3, in the present embodiment, the eight graphics processing units 10-17 are "daisy-chained" together. Each graphics processing unit 10-17 comprises a respective interconnect 30-37 that is connected to the interconnect of the adjacent graphics processing unit(s) in the daisy-chain sequence.

Each graphics processing unit 10-17 can operate in one or more of standalone mode, master mode, and slave mode. To facilitate this, as shown in FIG. 3, a partition manager (control circuit) 300 is connected to each GPU 10-17 via a respective configuration connection 60-67. The configuration connections 60-67 are used by the partition controller 300 to configure the GPUs 10-17 to operate in desired modes of operation.

The partition manager 300 comprises sets of control registers (not shown) which can be used to configure the operation of the partition manager 300. The overall arrangement is in an embodiment as described in US 2019/0056955.

The operating mode of a GPU 10-17 (standalone, master or slave mode) is set (enabled and disabled) by configuring it's interconnect 30-37 appropriately. For example, when a GPU is to operate in standalone mode, it's interconnect is configured to prevent communication with other graphics processing units. Correspondingly, when a GPU is to act as a master or slave, it's interconnect is configured to allow communication with one or two connected GPUs, as appropriate.

Moreover, when a GPU is operating in master or standalone mode, the GPO's job manager will operate to distribute tasks appropriately, and the GPO's tiling unit will operate to prepare primitive lists as appropriate. When a GPU is operating in slave mode, however, its job manager and tiling unit will be disabled.

As shown in FIG. 3, in the present embodiment, the system includes three "large" tiling units 20, 24, 25, and four "small" tiling units 22, 23, 26, 27. Each "large" tiling unit has sufficient processing throughput (capacity) to prepare primitive lists for operating in combination with all 24 shader cores in combination. That is, the time that a "large" tiling unit is expected to take to prepare primitive lists for a typical render output, e.g. frame for display, will be approximately equal to the time that a set of 24 execution units is expected to take to perform vertex (or fragment) processing operations for that render output.

Each "small" tiling unit, however, has sufficient processing throughput (capacity) to prepare primitive lists for operating in combination with only 6 shader cores in combination. That is, the time that a "small" tiling unit is expected to take to prepare primitive lists for a typical render output, e.g. frame for display, will be approximately equal to the time that a set of 6 execution units is expected to take to perform vertex (or fragment) processing operations for that render output. As illustrated in FIG. 3, the silicon area taken up by a "small" tiler is accordingly less than that taken up by a "large" tiler.

Other tiling unit throughputs (processing capacities) would be possible.

As will now be explained in more detail, the system is configured to minimize the total number of "large" tiling units, while still allowing a high degree of flexibility.

FIG. 4 illustrates all of the possible modes 401-415 that the partition manager 300 can configure the data processing system of this embodiment to operate in accordance with. Other arrangements would be possible.

In the present embodiment, the communication between GPUs 10-17 is such that a GPU can only act as a master GPU to control one or more contiguous GPUs that follow it in the daisy-chain sequence (and such that a GPU can only act as a slave GPU to be controlled by a GPU that precedes it in the daisy-chain sequence). (Other arrangements would, of course, be possible.)

This means that, as illustrated by mode 401 of FIG. 4, in the case where all of the GPUs 10-17 are acting in combination as a single partition, the first GPU 10 will be configured by the partition manager 300 to act as the master, while all of the other, following GPUs 11-17 are configured by the partition manager 300 to act as slaves. In this mode, the tiling unit 20 of the first GPU 10 will be used to prepare primitive lists for use by all eight of the shader core sets 50-57, i.e. for all 24 shader cores. Accordingly, as can be seen in FIG. 3, tiling unit 20 is a "large" tiling unit so that it can match the throughput (processing capacity) of all 24 shader cores combined.

The last GPU 17, however, cannot operate as a master GPU, because there are no GPUs following it in the daisy-chain sequence. Accordingly, and as can be seen in FIG. 3, tiling unit 27 is a "small" tiling unit because it only needs to be able match the throughput (processing capacity) of the three shader cores 57 of GPU 17 that it will prepare primitive lists for when GPU 17 is operating in standalone mode.

Similarly, since the penultimate GPU 16 in the sequence has only one other GPU 17 following it in the daisy-chain sequence, it will only be able to act as master to control a maximum of one other GPU 17. This means that tiling unit 26 will only need to prepare primitive lists for a maximum of six shader cores in combination. Accordingly, and as can be seen in FIG. 3, tiling unit 26 is also a "small" tiling unit.

As illustrated by mode 408 of FIG. 4, in the case where the GPUs 10-17 are divided evenly into two partitions, the first four GPUs 10-13 act in combination as a first partition, and the other four GPUs 14-17 act in combination as a second partition. In this "4-4" mode 408, GPU 10 acts as a master for slave GPUs 11-13, and GPU 14 acts as a master for slave GPUs 15-17. In this mode, the tiling unit 20 of GPU 10 will be used to prepare primitive lists for use by four shader core sets 50-53 (i.e. 12 shader cores), and the tiling unit 24 of GPU 14 will be used to prepare primitive lists for use by the other four shader core sets 54-57 (i.e. 12 shader cores). Since, as mentioned above, tiling unit 20 is a "large" tiling unit, it will be able to match the throughput (processing capacity) of 12 shader cores combined. Furthermore, as can be seen in FIG. 3, tiling unit 24 is also a "large" tiling unit so that it can match the throughput (processing capacity) of the other 12 shader cores combined.

Mode 405 of FIG. 4 illustrates the first five GPUs 10-14 acting in combination as a first partition, and the other three GPUs 15-17 acting in combination as a second partition. In this "5-3" mode, GPU 10 acts as a master to control slave GPUs 11-14, and GPU 15 acts as a master to control slave GPUs 16-17. In this mode, the tiling unit 20 of GPU 10 will be used to prepare primitive lists for use by five shader core sets 50-54 (i.e. 15 shader cores), while the tiling unit 25 of GPU 15 will be used to prepare primitive lists for use by three shader core sets (i.e. 9 shader cores). Since tiling unit 20 is a "large" tiling unit, it will be able to match the throughput (processing capacity) of 15 shader cores combined. Furthermore, as can be seen in FIG. 3, tiling unit 25 is also a "large" tiling unit so that it can match the throughput (processing capacity) of the other 9 shader cores combined.

It will be appreciated here that while it would be possible, for example, for the first three GPUs 10-12 to act in combination as a first partition, and the other five GPUs 13-17 to act in combination as a second partition, such a "3-5" mode would involve GPU 13 acting as a master to control slave GPUs 14-17. This means that tiling unit 23 would need to be able to prepare primitive lists for use by five shader core sets 53-57 (i.e. 15 shader cores), and so would need to be a "large" tiling unit. Thus, if both "5-3" and "3-5" modes were possible, an additional "large" tiling unit would need to be provided.

In the present embodiment, therefore, where there are multiple different modes whereby the GPUs 10-17 could be divided into partitions of particular sizes, the partition manager 300 only allows and supports a single one of those possible modes. For example, in the present embodiment, the partition manager 300 allows the "5-3" mode 405 in which the first five GPUs 10-14 act in combination and the other three GPUs 15-17 act in combination, but does not allow a "3-5" mode in which the first three GPUs 10-12 act in combination and the other five GPUs 13-17 act in combination. It will be appreciated that limiting the possible modes in this manner can reduce the number of "large" tiling units required.

Similarly, as shown in FIG. 4, other allowed modes in which the GPUs are divided into two partitions are a "7-1" mode 402, and a "6-2" mode 403, but, e.g., "1-7" and "2-6" modes are not allowed by the partition manager 300.

As shown in FIG. 4, in the present embodiment, allowed modes in which the GPUs are divided into three partitions are a "6-1-1" mode 404, a "5-2-1" mode 406, a "4-3-1" mode 409, a "4-2-2" mode 410 and a "3-2-3" mode 412. Allowed modes in which the GPUs 10-17 are divided into four partitions are a "5-1-1-1" mode 407, a "4-2-1-1" mode 411, a "3-1-1-3" mode 413, a "3-2-2-1" mode 414, and a "2-2-2-2" mode 415. While it would be possible to configure the system to be able to support more partitions, in the present embodiment the system is limited to supporting a maximum of four partitions at any one time.

Other arrangements for allowed modes would be possible.

It will be appreciated that all of the modes illustrated in FIG. 4 can be accommodated with only three "large" tiling units 20, 24, 25, while all of the other tiling units 22, 23, 26, 27 are "small" tiling units.

Furthermore, in the present embodiment, the second GPU 11 only ever needs to operate in slave mode, and as such, does not need a tiling unit at all. Thus, as shown in FIG. 3, in the present embodiment a tiling unit is omitted from GPU 11. As shown in FIG. 3, job manager and memory management unit (MMU) are also omitted from GPU 11 for corresponding reasons.

Other distributions of tiling units, GPUs and possible modes of operation, would, of course, be possible.

Figure 5:
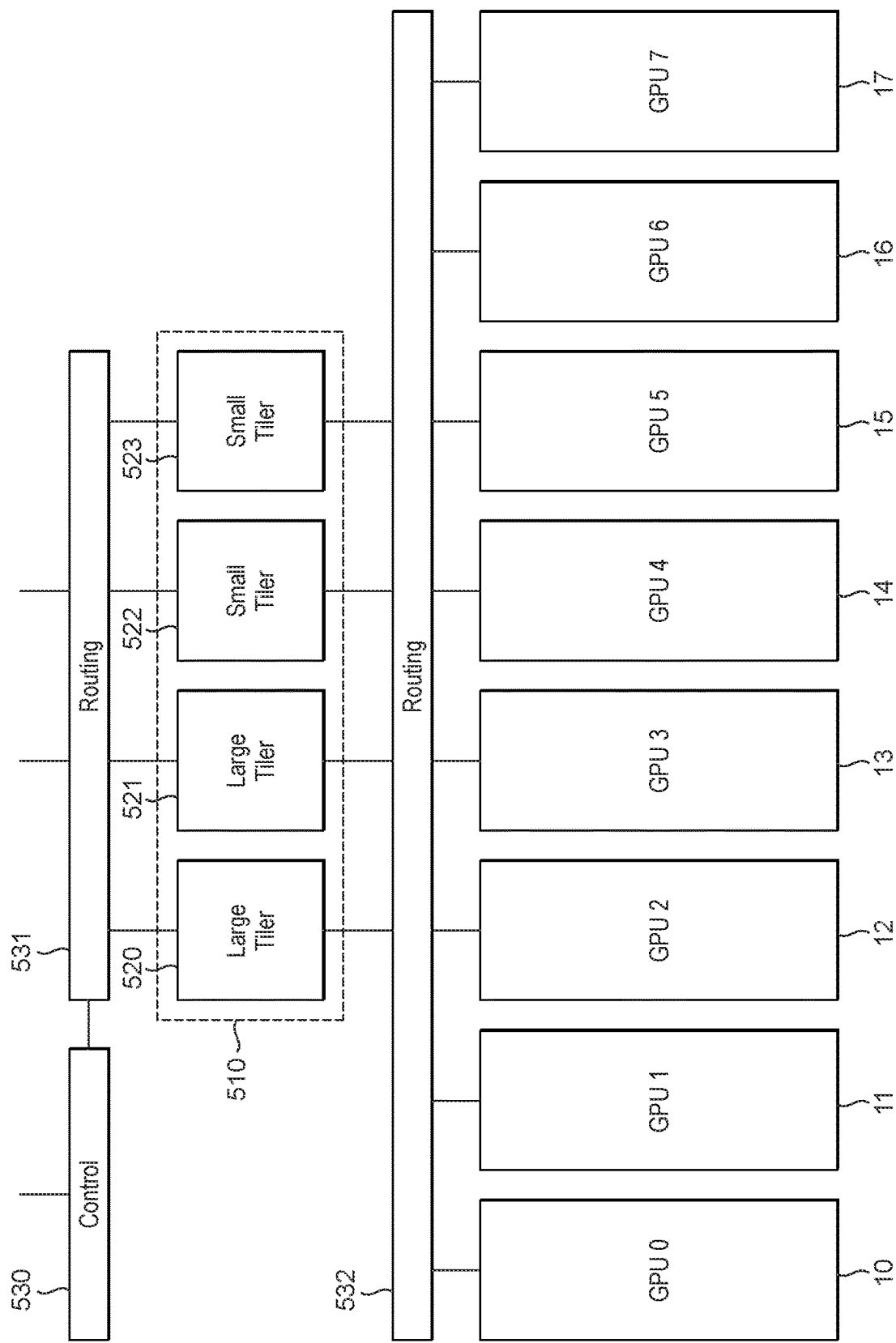
FIG. 5 shows a data processing system in accordance with another embodiment of the technology described herein.

Although in the above embodiments, each tiling unit 20, 22-27 is provided as components of (i.e. on the same chip as) a particular GPU 10, 12-17, and can thus only prepare primitive lists for partitions that the GPU is part of, FIG. 5 shows an alternative embodiment in which tiling units having different (maximum) throughputs (processing capacities) 520-523 are provided in an external pool 510, such that each tiling unit 520-523 can be assigned to any desired partition.

As shown in FIG. 5, in this case, the system includes a first configurable interconnect 531 that is operable to route graphics processing tasks to the tiling units 520-523 in the pool 510, and a second configurable interconnect 532 that is operable to route communications between the tiling units 520-523 and the GPUs 10-17. The system further includes a control circuit 530 that is operable to select a tiling unit from the pool 510 to be used for a particular partition of one or more GPUs based on the processing throughput (capacity) required for that partition, and to configure the interconnects 531, 532 appropriately to route graphics processing tasks for the partition to the selected tiling unit, and route communications between the selected tiling unit and the one or more GPUs of the partition.

This arrangement may allow a further reduction in the number of "large" tiling units, as well as the overall number of tiling units, e.g. as compared to the arrangement of FIGS. 3 and 4 described above. For example, as shown in Figure in this case the pool 510 may include only two "large" tiling units 520, 521, and two "small" tiling 522, 533. In this case, the total number of tiling units in the pool 510 may be the same as the maximum number of partitions supported at any one time, i.e. four in this embodiment.

Alternatively, it would be possible to provide fewer tiling units in the pool 510 than the maximum number of partitions supported at any one time. In this case, a tiling unit may be assigned dynamically, and change ownership as required.

Although in the above embodiments, tiling units are limited to having one of two possible (maximum) processing throughputs (capacities) (i.e. corresponding to a "large" tiling and a "small" tiling unit), in other embodiments there may be more than two possible processing capacities that a tiling unit can have, such as three, four or more different possible throughputs (processing capacities). Each such tiling unit may have the minimum possible processing throughput (capacity) that is sufficient to prepare primitive lists for the maximum possible number of shader cores that the tiling unit can prepare primitive lists for.

Although in the above embodiments, the processing throughput (capacity) of the tiling units is varied and minimized, it would also or instead be possible for the processing throughput (capacity) of other functional units to be varied and minimized in substantially the same manner. For example, the throughput (processing capacity) of the (task) management circuit (job manager) and/or memory management unit (MMU) may be varied and minimized in substantially the same manner.

Although in the above embodiments, the functional units operate in combinations with a graphics processing units, in other embodiments the functional units may operate in combination with other forms of processing units, such as central processing units (CPUs), video processing units, neural network processing units, etc. For example, in an embodiment, a plurality of discrete cosine transform (DCT) units having different (maximum supported) throughputs (processing capacities) is provided in combination with a plurality of combinable video processing units.

In an embodiment, a plurality of Direct Memory Access (DMA) controllers having different (maximum supported) throughputs (processing capacities) is provided in combination with a plurality of combinable processing units (e.g. CPUs or GPUs). In an embodiment, a plurality of memory data compression/decompression units (codecs) is provided in combination with a plurality of combinable processing units (e.g. CPUs or GPUs).

In an embodiment, a plurality of fixed-function task management circuits having different (maximum supported) throughputs (processing capacities) is provided in combination with a plurality of programmable processing units. Each task management circuit is operable to divide an overall processing task into sub-tasks, and distribute the sub-tasks to the processing units to be performed by the processing units in parallel (independently and at the same time).

It will be appreciated from the above that the technology described herein, in its embodiments at least, provides arrangements in which the hardware/silicon area costs associated with functional units, e.g. tiling units, in a data processing system that comprises plural connected graphics processing units and plural functional units, can be reduced. This is achieved, in the embodiments of the technology described herein at least, by providing at least one functional unit that has a (maximum supported) processing throughput (capacity) that is less than that required for all of the plural graphics processing units combined.

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

The invention claimed is:

1. A data processing system, comprising:
   a plurality of processing units, wherein one or more of the processing units are operable in combination with at least one other processing unit of the plurality of processing units such that respective sets of one or more processing units of the plurality of processing units can generate respective data processing outputs; and,
   a plurality of functional units configured to perform the same type of processing operation, each functional unit operable in combination with a set of one or more of the processing units when generating a data processing output;
   wherein the processing capacity of at least one functional unit of the plurality of functional units for performing the processing operation is greater than the processing capacity of at least one other functional unit of the plurality of functional units for performing the processing operation; and
   wherein the processing capacity of the at least one functional unit for performing the processing operation is sufficient to match a processing capacity of a maximum possible number of the processing units operating in combination to generate a data processing output, and the processing capacity of the at least one other functional unit for performing the processing operation is not sufficient to match the processing capacity of the maximum possible number of the processing units operating in combination to generate a data processing output.

2. The system of claim 1, further comprising a control circuit configured to partition the plurality of processing units into one or more sets of one or more processing units, wherein each set of one or more processing units is operable to generate a data processing output independently of any other set of one or more processing units of the one or more sets of one or more processing units, and such that each set of one or more processing units operates in combination with a functional unit of the plurality of functional units that has a processing capacity for performing the processing operation that is sufficient to match a processing capacity of the set of one or more processing units for generating a data processing output.

3. The system of claim 1, wherein each processing unit comprises a respective set of one or more execution units that are each operable to use an output of the processing operation as an input and/or to generate an input of the processing operation, and wherein the processing capacity of the at least one functional unit for performing the processing operation is sufficient to match a processing capacity of a maximum possible number of the execution units operating in combination to generate a data processing output, and the processing capacity of the at least one other functional unit for performing the processing operation is sufficient to match a processing capacity of some but not all of the maximum possible number of the execution units operating in combination to generate a data processing output.

4. The system of claim 1, wherein the processing capacity of each functional unit of the plurality of functional units for performing the processing operation is either a first processing capacity or a second, lower processing capacity.

5. The system of claim 1, wherein each functional unit of the plurality of functional units is included in a respective processing unit of the plurality of processing units.

6. The system of claim 5, wherein each processing unit that is operable in combination with at least one other processing unit of the plurality of processing units under the control of the respective processing unit includes a functional unit whose processing capacity for performing the processing operation is based on a combined processing capacity for generating a data processing output of the respective processing unit and of each of the at least one other processing unit of the plurality of processing units that the respective processing unit can operate in combination with.

7. The system of claim 1, comprising a control circuit operable to select a functional unit of the plurality of functional units to operate in combination with a set of one or more processing units when generating a data processing output based on a processing capacity of the set of one or more processing units for generating a data processing output.

8. The system of claim 2, wherein the control circuit is configured to partition the plurality of processing units in accordance with a mode of operation of a selected set of plural different modes of operation.

9. The system of claim 8, wherein the processing capacity of each functional unit of the plurality of functional units is selected based on the selected set of plural different modes of operation.

10. The system of claim 1, wherein each processing unit of the plurality of processing units is configured to perform graphics processing operations, and the functional units of the plurality of functional units are all tiling units, or all graphics processing unit task management circuits, or all memory management units (MMUs).

11. The system of claim 1, wherein different processing units of the plurality of processing units comprise different numbers of execution units.

12. A method of operating a data processing system that comprises:
    a plurality of processing units, wherein one or more of the processing units are operable in combination with at least one other processing unit of the plurality of processing units such that respective sets of one or more processing units of the plurality of processing units can generate respective data processing outputs; and,
    a plurality of functional units configured to perform the same type of processing operation, each functional unit operable in combination with a set of one or more of the processing units when generating a data processing output;
    wherein the processing capacity of at least one functional unit of the plurality of functional units for performing the processing operation is greater than the processing capacity of at least one other functional unit of the plurality of functional units for performing the processing operation;
    the method comprising:
       configuring a set of one or more processing units of the plurality of processing units to generate a data processing output;
       configuring a functional unit of the plurality of functional units that has a processing capacity for performing the processing operation that is sufficient to match a processing capacity of the set of one or more processing units for generating a data processing output to operate in combination with the set of one or more processing units when generating the data processing output; and, the functional unit performing the processing operation when operating in combination with the set of one or more processing units when generating the data processing output;

wherein the processing capacity of the at least one functional unit for performing the processing operation is sufficient to match a processing capacity of a maximum possible number of the processing units operating in combination to generate a data processing output, and the processing capacity of the at least one other functional unit for performing the processing operation is not sufficient to match the processing capacity of the maximum possible number of the processing units operating in combination to generate a data processing output; and wherein the method comprises: when a set of the maximum possible number of the processing units is generating a data processing output: configuring one of the at least one functional unit to operate in combination with the set of the maximum possible number of the processing units when generating the data processing output; and the functional unit performing the processing operation when operating in combination with the set of the maximum possible number of the processing units when generating the data processing output.

13. The method of claim 12, wherein each processing unit comprises a respective set of one or more execution units that are each operable to use an output of the processing operation as an input and/or to generate an input of the processing operation, and wherein the processing capacity of the at least one functional unit for performing the processing operation is sufficient to match a processing capacity of a maximum possible number of the execution units operating in combination to generate a data processing output, and the processing capacity of the at least one other functional unit for performing the processing operation is sufficient to match a processing capacity of a selected number but not all of the maximum possible number of the execution units operating in combination to generate a data processing output; the method comprising: when a set of one or more processing units that comprises more than the selected number of execution units is generating a data processing output: configuring one of the at least one functional unit to operate in combination with the set of one or more processing units that comprises more than the selected number of execution units when generating the data processing output; and the functional unit performing the processing operation when operating in combination with the set of one or more processing units that comprises more than the selected number of execution units when generating the data processing output; and when a set of one or more processing units that comprises less than or equal to the selected number of execution units is generating a data processing output: configuring one of the at least one other functional unit to operate in combination with the set of one or more processing units that comprises less than or equal to the selected number of execution units when generating the data processing output; and the functional unit performing the processing operation when operating in combination with the set of one or more processing units that comprises less than or equal to the selected number of execution units when generating the data processing output.

14. The method of claim 12, wherein the processing capacity of each functional unit of the plurality of functional units for performing the processing operation is either a first processing capacity or a second, lower processing capacity.

15. The method of claim 12, wherein each functional unit of the plurality of functional units is included in a respective processing unit of the plurality of processing units.

16. The method of claim 12, comprising:
selecting a functional unit of the plurality of functional units to operate in combination with a set of one or more processing units when generating a data processing output based on a processing capacity of the set of one or more processing units for generating a data processing output;
the selected functional unit operating in combination with the set of one or more processing units when generating a data processing output.

17. The method of claim 12, wherein each processing unit of the plurality of processing units is configured to perform graphics processing operations, and the functional units of the plurality of functional units are all tiling units, or all graphics processing unit task management circuits, or all memory management units (MMUs).

18. A computer program comprising computer software code for performing the method claim 12 when the program is run on a data processor.

19. A method of providing a data processing system that comprises a plurality of processing units and a plurality of functional units configured to perform the same type of processing operation, the method comprising:
providing the plurality of processing units, wherein one or more of the processing units are operable in combination with at least one other processing unit of the plurality of processing units;
providing a control circuit configured to partition the plurality of processing units into one or more sets of one or more processing units in accordance with a mode of operation of a selected set of plural different modes of operation, such that each set of one or more processing units is operable to generate a data processing output; and,
providing the plurality of functional units, each functional unit operable in combination with a set of one or more of the processing units when generating a data processing output;
wherein the processing capacity of at least one functional unit of the plurality of functional units for performing the processing operation is greater than the processing capacity of at least one other functional unit of the plurality of functional units for performing the processing operation; and
wherein the processing capacity of the at least one functional unit for performing the processing operation is sufficient to match a processing capacity of a maximum possible number of the processing units operating in combination to generate a data processing output, and the processing capacity of the at least one other functional unit for performing the processing operation is not sufficient to match the processing capacity of the maximum possible number of the processing units operating in combination to generate a data processing output; and
wherein providing the plurality of functional units comprises selecting the processing capacities of the functional units for performing the processing operation based on the selected set of plural different modes of operation.

* * * * *